United States Patent
Yabuki

(10) Patent No.: US 6,307,671 B1
(45) Date of Patent: Oct. 23, 2001

(54) OPTICAL FILTER COMPRISING TRANSPARENT SUPPORT AND FILTER LAYER CONTAINING DYE AND BINDER POLYMER

(75) Inventor: Yoshiharu Yabuki, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/583,743

(22) Filed: May 31, 2000

(30) Foreign Application Priority Data

May 31, 1999 (JP) .................................... 11-152823
Sep. 7, 1999 (JP) .................................... 11-252731

(51) Int. Cl.[7] .............................. F21V 9/06; G02B 5/20; G02B 5/22; G03C 5/815; G03C 1/06
(52) U.S. Cl. ......................... 359/361; 359/350; 359/885; 252/588; 252/589; 313/489; 430/512; 430/517; 526/261
(58) Field of Search ................................... 359/350, 361, 359/885; 430/512, 517, 507; 252/589, 582, 588; 526/259, 261

(56) References Cited

U.S. PATENT DOCUMENTS

| | | | |
|---|---|---|---|
| 5,498,345 | * 3/1996 | Jollenbeck et al. | 252/589 |
| 5,500,332 | * 3/1996 | Vishwakarma et al. | 430/512 |
| 5,610,000 | * 3/1997 | Vishwakarma et al. | 430/512 |
| 5,945,465 | * 8/1999 | Ozark et al. | 523/106 |

\* cited by examiner

Primary Examiner—Audrey Chang
(74) Attorney, Agent, or Firm—Burns, Doane, Swecker & Mathis, LLP

(57) ABSTRACT

An optical filter comprises a transparent support and a filter layer. The filter layer contains a dye and a binder polymer. The dye is a methine dye in an aggregated form. The transparent support, the filter layer or an optional layer further contains a specific ultraviolet absorbing agent represented by the formula (I), (II), or (III).

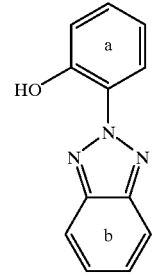

(I)

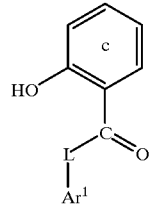

(II)

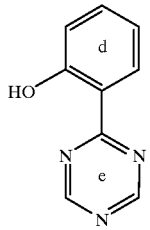

(III)

12 Claims, 4 Drawing Sheets

US 6,307,671 B1

OPTICAL FILTER COMPRISING TRANSPARENT SUPPORT AND FILTER LAYER CONTAINING DYE AND BINDER POLYMER

This application claims priority under 35 U.S.C. §§119 and/or 365 to 11-152823 and 11-252731 filed in Japan on May 31, 1999 and Sep. 7, 1999, respectively; the entire contents of which are hereby incorporated by reference.

FIELD OF THE INVENTION

The present invention relates to an optical filter comprising a transparent support and a filter layer. In more detail, the invention relates to an optical filter covering a display surface of a display device such as a liquid crystal display device (LCD), a plasma display panel (PDP), an electroluminescence display (ELD), a cathode-ray tube (CRT), a fluorescent indicator tube or a field emission display to improve the color reproducibility of the display.

BACKGROUND OF THE INVENTION

A display device such as a liquid crystal display device (LCD), a plasma display panel (PDP), an electroluminescence display (ELD), a cathode-ray tube (CRT), a fluorescent indicator tube or a field emission display displays a color image with a combination of the three primary colors (i.e., red, blue, green). However, it is very difficult (substantially impossible) to use the ideal three primary colors. For example, the plasma display panel uses phosphors of the three primary colors, which emit light containing an unnecessary component (in the wavelength region of 560 to 620 nm). Therefore, it has been proposed to correct the color balance of the displayed image by an optical filter absorbing the unnecessary component. The optical filter for the color correction is described in Japanese Patent Provisional Publication Nos. 58(1983)-53904, 60(1985)-118748, 60(1985)-18749, 61(1986)-188501, 3(1991)-231988, 5(1993)-203804, 5(1993)-205643, 7(1995)-307133, 9(1997)-145918, 9(1997)-306366 and 10(1998)-26704.

The display device needs prevention of reflection as well as the color collection. On the screen of the display device, the surrounding scene is often reflected to impair the contrast of the displayed image. Various anti-reflection films have been proposed to solve the problem of reflection. The known anti-reflection layers are categorized into two types, namely evaporating (and depositing) layers and coating layers. The evaporating layers are superior to the coating layers in view of optical characteristics, but the coating layers are easily formed compared with the evaporating layers.

The evaporating layers have been used as anti-reflection films for lenses of glasses or cameras. The layers are generally formed by a vacuum deposition process, a spattering method, an ion plating method, a CVD method or a PVD method.

The coating layers can be formed by coating a dispersion of fine particles and a binder. The coating layers are described in Japanese Patent Provisional Publication Nos. 59(1984)-49501, 59(1984)-50401, 60(1985)-59250 and 7(1995)-48527.

The anti-reflection layers can be introduced into the optical filters. The optical filters having the anti-reflection layers are disclosed in Japanese Patent Provisional Publication Nos. 61(1986)-188501, 5(1993)-205643, 9(1996)-145918, 9(1996)-306366 and 10(1997)-26704. The optical filter described in 61(1986)-188501, 5(1993)-205643, 9(1996)-145918 or 9(1996)-306366 has a transparent support containing a dye or a pigment so that the support functions as an optical filter. Further, the optical filter described in 10(1997)-26704 comprises a colored hard coating (surface hardening) layer provided between a support and an anti-reflection layer, so that the hard coating layer functions as an optical filter.

SUMMARY OF THE INVENTION

A colored transparent support or a colored hard coating layer can function as an optical filter. However, it is difficult to incorporate a dye or pigment into the support or the hard coating layer.

The transparent support is made of glass or plastics (usually, plastics). Therefore, the dye or pigment contained in the support must have enough heat resistance to a high temperature in the production process of the support.

The hard coating layer generally comprises a cross-linked polymer. In forming the layer, the polymer is cross-linked after coating a polymer solution. The dye or pigment added in the solution often fades at the crosslinking reaction.

Many methine dyes have been researched in the field of silver halide photography. The methine dyes have various absorption spectra. The methine dye in an aggregated form has a sharp absorption peak (a narrow half width). The methine dyes have been developed to be contained in a photographic material (usually in a gelatin layer). If the methine dyes are incorporated into the support or the hard coating layer, the dyes usually have problems of fading.

The applicants have tried to add the methine dyes not to the support or the hard coating layer (which restricts the dyes or pigments), but in a polymer layer. The polymer layer can be formed under moderate conditions. Many photographic methine dyes can be contained in the polymer layer, which functions as an optical filter. However, the polymer layer does not protect the dyes, compared with the support and the hard coating layer. Therefore, the methine dyes in an aggregated form to be contained in the polymer layer are preferably improved in durability (particularly, light resistance). The methine dyes should be improved without disturbing the function (color correction) of the dye. The dyes should also be improved without absorbing light for an image emitted from the phosphors. Further, the dye should be improved without coloring the image display device when the image is not displayed.

An object of the present invention is to provide an optical filter having a function of correcting color appropriately.

Another object of the invention is to provide an optical filter which can advantageously be used with a plasma display panel.

The present invention provides an optical filter which comprises a transparent support and a filter layer containing a dye and a binder polymer, wherein the dye is a methine dye in an aggregated form, and wherein the transparent support, the filter layer or an optional layer further contains an ultraviolet absorbing agent represented by the formula (I), (II), (III), (IV), (V), (VI), (VII) or (VIII):

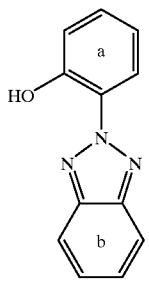

in which the benzene rings a and b may have a substituent group;

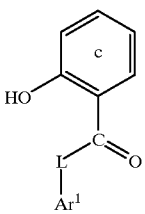

in which Ar¹ is an aryl group or an aromatic heterocyclic group; —L— is a single bond or —O—; and the benzene ring c may have a substituent group;

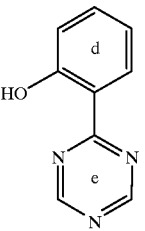

in which the benzene ring d and the triazine ring e may have a substituent group; and the benzene ring d may be condensed with another aromatic ring or a heterocyclic ring;

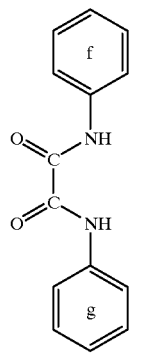

in which the benzene rings f and g may have a substituent group;

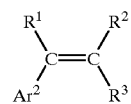

in which $Ar^2$ is an aryl group or an aromatic heterocyclic group; $R^1$ is hydrogen or an alkyl group; and each of $R^2$ and $R^3$ independently is cyano, —$COR^{13}$, —$COOR^{14}$, —$CONR^{15}R^{16}$, —$SO_2R^{17}$ or —$SO_2NR^{18}R^{19}$, wherein each of $R^{13}$, $R^{14}$, $R^{15}$, $R^{16}$, $R^{17}$, $R^{18}$ and $R^{19}$ independently is hydrogen, an alkyl group, a substituted alkyl group or an aryl group, or $R^2$ and $R^3$ are combined to form a five-membered or six-membered ring;

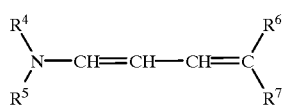

in which each of $R^4$ and $R^5$ independently is hydrogen, an alkyl group or an aryl group, or $R^4$ and $R^5$ are combined to form a five-membered or six-membered ring; and each of $R^6$ and $R^7$ independently is cyano, —$COR^{20}$, —$COOR^{21}$, —$CONR^{22}R^{23}$, —$SO_2R^{24}$ or —$SO_2NR^{25}R^{26}$, wherein each of $R^{20}$, $R^{21}$, $R^{22}$, $R^{23}$, $R^{24}$, $R^{25}$ and $R^{26}$ independently is hydrogen, an alkyl group, a substituted alkyl group or an aryl group, or $R^6$ and $R^7$ are combined to form a five-membered or six-membered ring;

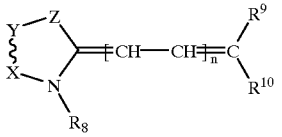

in which $R^8$ is an alkyl group, a substituted alkyl group or an aryl group; each of $R^9$ and $R^{10}$ independently is cyano, —$COR^{27}$, —$COOR^{28}$, —$CONR^{29}R^{30}$, —$SO_2R^{31}$ or —$SO_2NR^{32}R^{33}$, wherein each of $R^{27}$, $R^{28}$, $R^{29}$, $R^{30}$, $R^{31}$, $R^{32}$ and $R^{33}$ independently is hydrogen, an alkyl group, a substituted alkyl group or an aryl group, or $R^9$ and $R^{10}$ are combined to form a five-membered or six-membered ring; —X~Y— is —$CR^{34}R^{35}$—$CR^{36}R^{37}$— or —$CR^{38}$=$CR^{39}$—, wherein each of $R^{34}$, $R^{35}$, $R^{36}$, $R^{37}$, $R^{38}$ and $R^{39}$ independently is hydrogen, an alkyl group or an aryl group, or $R^{38}$ and $R^{39}$ are combined to form a benzene or naphthalene ring; —Z— is —O—, —S—, —$NR^{40}$—, —$CR^{41}R^{42}$— or —CH=Ch—, wherein $R^{40}$ is an alkyl group, a substituted alkyl group or an aryl group, and each of $R^{41}$ and $R^{42}$ independently is hydrogen or an alkyl group; and n is 0 or 1;

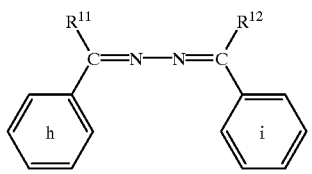

(VIII)

in which each of $R^{11}$ and $R^{12}$ independently is hydrogen, an alkyl group or an aryl group, or $R^{11}$ and $R^{12}$ are combined to form a five-membered or six-membered ring; the benzene rings h and i may have a substituent group; and the benzene rings h and i may be condensed with another aromatic ring or a heterocyclic ring.

The ultraviolet absorbing agent preferably is an o-substituted phenol represented by the formula (I), (II) or (III).

The invention also provides a plasma display panel having a display surface covered with an optical filter which comprises a transparent and a filter layer containing a dye and a binder polymer, wherein the dye is a methine dye in an aggregated form, and wherein the transparent support, the filter layer or an optional layer further contains an ultraviolet absorbing agent represented by the formula (I), (II), (III), (IV), (V), (VI), (VII) or (VIII).

The absorption maximum of the optical filter can easily be adjusted by using a methine dye in an aggregated form. Further, the methine dye in the aggregated form shows a sharp absorption peak (a narrow half width) appropriate for an image display device. However, the aggregated methine dye contained in a filter layer is unstable to an ultraviolet ray.

According to the study of the applicants, the compound represented by the formula (I), (II), (III), (IV), (V), (VI), (VII) or (VIII) gives ultraviolet resistance (durability against ultraviolet ray) to the methine dye in an aggregated form contained in an optical filter. The methine dye is now improved in durability by using the compound represented by the formula (I), (II), (III), (IV), (V), (VI), (VII) or (VIII), particularly the o-substituted phenol represented by the formula (I), (II) or (III) without disturbing the function (color correction) of the dye, without absorbing light for an image emitted from the phosphors and without coloring the image display device when the image is not displayed.

A known ultraviolet absorbing agent usually have a problem of durability of the agent itself to an ultraviolet ray. In an optical filter or an anti-reflection film, which is continually exposed to strong light containing ultraviolet ray, the ultraviolet absorbing agent should be stable to an ultraviolet ray to continue the ultraviolet absorbing function. The compound represented by the formula (I), (II), (III), (IV), (V), (VI), (VII) or (VIII), particularly the o-substituted phenol represented by the formula (I), (II) or (III) is stable to the ultraviolet ray. Therefore, the ultraviolet absorbing agent can protect the aggregated methine dye from the ultraviolet ray for a long term.

According to the present invention, various known methine dyes for photographic materials can be used in the optical filter. The absorption spectra of many methine dyes have been well studied in the field of photographic materials. Therefore, the color of the displayed image can be easily corrected by selecting a methine dye having an appropriate absorption spectrum.

DETAILED DESCRIPTION OF THE INVENTION

[Layered structure]

FIG. 1 shows sectional views schematically illustrating various embodiments of an optical filter, which comprises a filter layer and a transparent support.

Figure 1A:
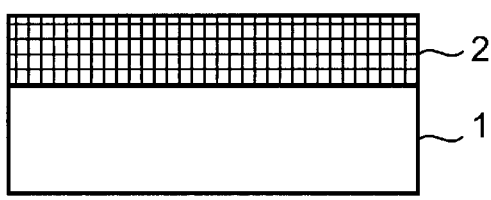
FIGS. 1(a) to 1(e) show sectional views schematically illustrating various embodiments of an optical filter, which comprises a filter layer and a transparent support.

The embodiment of FIG. 1(a) comprises a filter layer (2) and a transparent support (1) in this order. The filter layer (2) contains an ultraviolet absorbing agent.

Figure 1B:

The embodiment of FIG. 1(b) comprises a filter layer (2) and a transparent support (1) in this order. The transparent support (1) contains an ultraviolet absorbing agent.

Figure 1C:
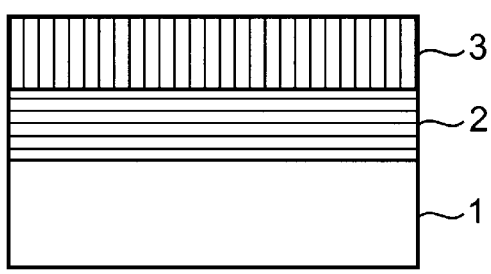

The embodiment of FIG. 1(c) comprises an ultraviolet absorbing layer (3), a filter layer (2) and a transparent support (1) in this order. The ultraviolet ray absorbing layer (3) contains an ultraviolet ray absorbing agent.

Figure 1D:
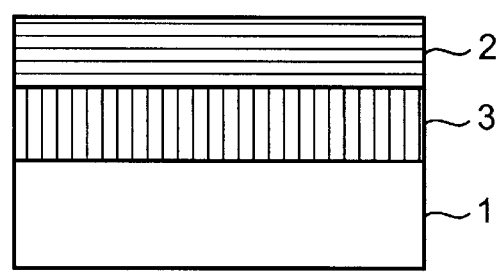

The embodiment of FIG. 1(d) comprises a filter layer (2), an ultraviolet absorbing layer (3) and a transparent support (1) in this order. The ultraviolet absorbing layer (3) contains an ultraviolet absorbing agent.

Figure 1E:
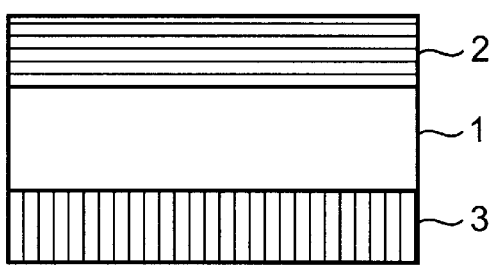

The embodiment of FIG. 1(e) comprises a filter layer (2), a transparent support (1) and an ultraviolet absorbing layer (3) in this order. The ultraviolet absorbing layer (3) contains an ultraviolet ray absorbing agent.

As is shown in FIG. 1, the ultraviolet absorbing agent can be incorporated into any layers of the optical filter.

The ultraviolet ray causing the problems is emitted from a light source outside the image display device. Accordingly, the ultraviolet absorbing agent should be arranged outside the methine dye or mixed with the dye. Therefore, an element (a layer or a support) containing the ultraviolet absorbing agent is arranged outside form the filter layer in the image display device, or the agent is added to the filter layer. The optical filter can be so placed on the display device that the transparent support is arranged outside the device or that the filter layer is arranged outside the device. Therefore, there is no specific limitation with respect to arrangement of the ultraviolet absorbing agent in view of the optical filter (not in view of the image display device), as is shown in FIG. 1.

FIG. 2 shows sectional views schematically illustrating various embodiments of an optical filter, which comprises a filter layer, a transparent support and an anti-reflection layer in this order.

Figure 2A:
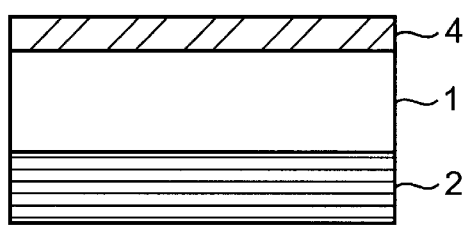
FIGS. 2(a) to 2(d) show sectional views schematically illustrating various embodiments of an optical filter, which comprises a filter layer, a transparent support and an anti-reflection layer in this order.

The embodiment of FIG. 2(a) comprises a filter layer (2), a transparent support (1) and a low refractive index layer (4) in this order. The layer (4) and the support (1) satisfy the condition of $n_4 < n_1$ in which $n_4$ and $n_1$ represent the refractive indexes of the layer (3) and the support (1) respectively.

Figure 2B:
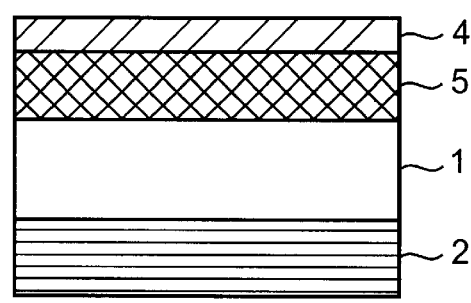

The embodiment of FIG. 2(b) comprises a filter layer (2), a transparent support (1), a hard coating layer (5) and a low refractive index layer (4) in this order.

Figure 2D:
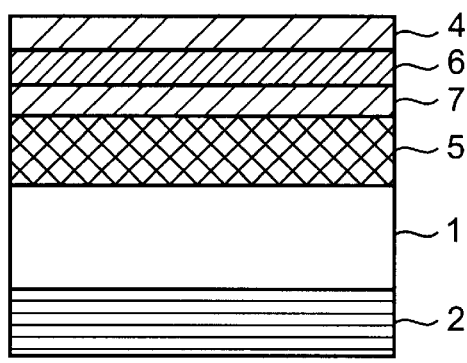
Figure 2C:
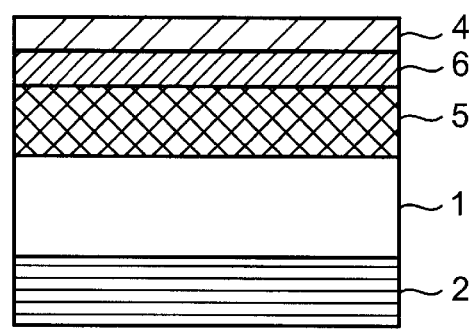

The embodiment of FIG. 2(c) comprises a filter layer (2), a transparent support (1), a hard coating layer (5), a high refractive index layer (6) and a low refractive index layer (4) in this order. The layers (4) and (6) and the support (1)

satisfy the condition of $n_4<n_1<n_6$ in which $n_4$, $n_1$ and $n_6$ represent the refractive indexes of the layer (4), the support (1) and the layer (6) respectively.

The embodiment of FIG. 2(d) comprises a filter layer (2), a transparent support (1), a hard coating layer (5), a middle refractive index layer (7), a high refractive index layer (6) and a low refractive index layer (4) in this order. The layers (4), (6) and (7) and the support (1) satisfy the condition of $n_4<n_1<n_7<n_6$ in which $n_4$, $n_1$, $n_7$ and $n_6$ represent the indexes of the layer (4), the support (1), the layer (7) and the layer (6) respectively.

An ultraviolet absorbing agent can be contained in the filter layer (2), the transparent support (1), the hard coating layer (5), the middle refractive index layer (7), the high refractive index layer (6), the low refractive index layer (4) or an optically formed layer (ultraviolet absorbing layer). The ultraviolet absorbing layer can be arranged between two elements (layer or support), or arranged as the uppermost layer or the lowermost layer. There is no specific limitation with respect to arrangement of the ultraviolet absorbing agent, as is described about the optical filter shown in FIG. 1.

FIG. 3 shows sectional views schematically illustrating various embodiments of an optical filter, which comprises a transparent support, a filter layer and an anti-reflection layer in this order.

Figure 3A:
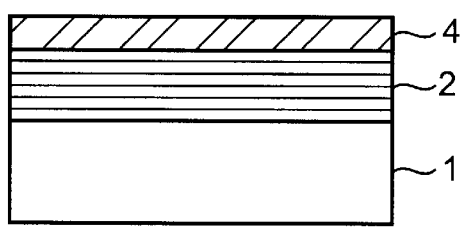
FIGS. 3(a) to 3(d) show sectional views schematically illustrating embodiments of an optical filter, which comprises a transparent support, a filter layer and an anti-reflection layer in this order.

The embodiment of FIG. 3(a) comprises a transparent support (1), a filter layer (2) and a low refractive index layer (4) in this order. With respect to the refractive index, the layer (4) and the support (1) satisfy the same condition as that of the embodiment of FIG. 2(a).

Figure 3B:
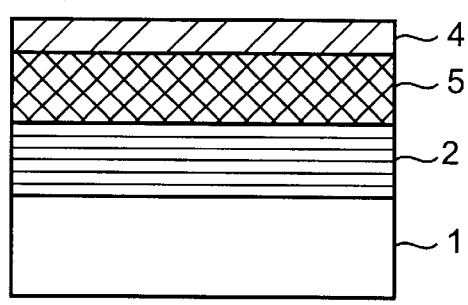

The embodiment of FIG. 3(b) comprises a transparent support (1), a filter layer (2), a hard coating layer (5) and a low refractive index layer (4) in this order.

Figure 3D:
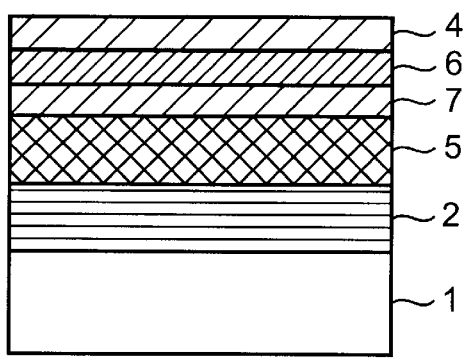
Figure 3C:
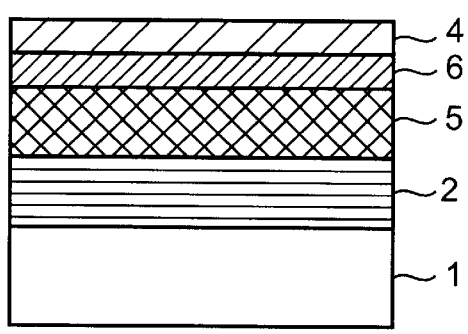

The embodiment of FIG. 3(c) comprises a transparent support (1), a filter layer (2), a hard coating layer (5), a high refractive index layer (6) and a low refractive index layer (4) in this order. With respect to the refractive index, the layers (4) and (6) and the support (1) satisfy the same condition as that of the embodiment of FIG. 2(c).

The embodiment of FIG. 3(d) comprises a transparent support (1), a filter layer (2), a hard coating layer (5), a middle refractive index layer (7), a high refractive index layer (6) and a low refractive index layer (4) in this order. With respect to the refractive index, the layers (4), (6) and (7) and the support (1) satisfy the same condition as that of the embodiment of FIG. 2(d).

There is no specific limitation with respect to arrangement of the ultraviolet absorbing agent, as is described about FIGS. 1 & 2.

[Ultraviolet absorbing agent]

The ultraviolet absorbing agent preferably is a compound of not disturbing the function (color correction) of the dye, not absorbing light for an image emitted from the phosphors and not coloring the image display device when the image is not displayed.

The ultraviolet absorbing agent preferably has the absorption maximum of the longest wavelength within the wavelength region of 300 to 390 nm. The absorption maximum of the longest wavelength is more preferably in the range of 310 to 380 nm, and most preferably in the range of 320 to 360 nm.

The absorption at the wavelength of 50 nm longer than the absorption maximum is preferably less than 10%, more preferably less than 7%, and most preferably less than 5% of the absorption at the absorption maximum.

An absorption spectrum of an ultraviolet absorbing agent is measured in a solution, since it is difficult to measure the spectrum in an optical filter because other components such as dispersed particles disturb the spectrum. Accordingly, an ultraviolet absorbing agent in a solution preferably satisfies the above-described absorption. The solvent of the solution is water (in the case of a water-soluble ultraviolet absorbing agent) or ethyl acetate (in the case of an oil-soluble ultraviolet absorbing agent).

Further, the ultraviolet absorbing agent is preferably stable to ultraviolet ray.

The present invention uses a compound represented by the formula (I), (II), (III), (IV), (V), (VI), (VII) or (VIII), and preferably an o-substituted phenol represented by the formula (I), (II) or (III) as an ultraviolet absorbing agent to satisfy the above-described requirements.

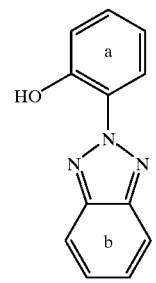

(I)

In the formula (I), the benzene rings a and b may have a substituent group.

Examples of the substituent groups include a halogen atom (F, Cl, Br), nitro, cyano, sulfo, an alkyl group, a substituted alkyl group, an alkenyl group, a substituted alkenyl group, an aryl group, a heterocyclic group, —O—R, —S—R, —CO—R, —CO—O—R, —O—CO—R, —SO—R, —SO$_2$—R, —NR$^2$, —NH—CO—R, —NH—SO$_2$—R, —CO—NR$^2$, —SO$_2$—NR$_2$, —NH—CO—O—R and —NH—CO—NR$_2$. R is hydrogen, an alkyl group, a substituted alkyl group, an alkenyl group, a substituted alkenyl group or an aryl group. Sulfo and carboxyl (—CO—O—R when R is hydrogen) can form a salt. In the present specification, sulfo and carboxyl can form a salt.

In the present specification, an alkyl group preferably has 1 to 20 carbon atoms. An alkyl group of a chain structure is preferred to a cyclic alkyl group. The alkyl group can have a branched chain. Examples of the alkyl groups include methyl, ethyl, isopropyl, butyl, sec-butyl, tert-butyl, pentyl, tert-pentyl, hexyl, octyl, 2-ethylhexyl, tert-octyl, decyl, dodecyl, hexadecyl, octadecyl, cyclopropyl, cyclopentyl cyclohexyl and bicyclo[2,2,2]octyl.

In the present specification, an alkyl moiety of a substituted alkyl group is the same as the above-described alkyl group. Examples of the substituent groups of the substituted alkyl groups include a halogen atom, nitro, a heterocyclic group, cyano, sulfo, an aryl group, —O—R, —S—R, —CO—R, —CO—O—R, —O—CO—R, —SO—R, —SO$_2$—R, —NR$^2$, —NH—CO—R, —NH—SO$_2$—R, —CO—NR$_2$, —SO$_2$—NR$^2$, —NH—CO—O—R and —NH—CO—NR$_2$. R is hydrogen, an alkyl group, a substituted alkyl group, an alkenyl group, a substituted alkenyl group or an aryl group.

In the present specification, an alkenyl group preferably has 2 to 20 carbon atoms. An alkenyl group of a chain structure is preferred to a cyclic alkenyl group. The alkenyl group can have a branched chain. Examples of the alkenyl groups include allyl, 2-butenyl and oleyl.

In the present specification, an alkenyl moiety of a substituted alkenyl group is the same as the above-described alkyl group. Examples of the substituent groups of the substituted alkenyl groups include a halogen atom, nitro, a heterocyclic group, cyano, sulfo, an aryl group, —O—R, —S—R, —CO—R, —CO—O—R, —O—CO—R, —SO—R, —SO$_2$—R, —NR$^2$, —NH—CO—R, —NH—SO$_2$—R, —CO—NR$_2$, —SO$_2$—NR$_2$, —NH—CO—O—R and —NH—CO—NR$_2$. R is hydrogen, an alkyl group, a substituted alkyl group, an alkenyl group, a substituted alkenyl group or an aryl group.

In the present specification, an aryl group preferably has 6 to 10 carbon atoms. Examples of the aryl groups include phenyl and naphthyl.

The aryl group can have a substituent group. Examples of the substituent groups include a halogen atom, nitro, a heterocyclic group, cyano, sulfo, an aryl group, —O—R, —S—R, —CO—R, —CO—O—R, —O—CO—R, —SO—R, —SO$_2$—R, —NR$^2$, —NH—CO—R, —NH—SO$_2$—R, —CO—NR$_2$, —SO$_2$—NR$_2$, —NH—CO—O—R and —NH—CO—NR$_2$. R is hydrogen, an alkyl group, a substituted alkyl group, an alkenyl group, a substituted alkenyl group or an aryl group.

In the present specification, a heterocyclic group preferably has a five-membered or six-membered heterocyclic ring. Examples of the heterocyclic groups include furan ring, thiophene ring, indole ring, pyrrole ring, pyrazole ring, imidazole ring and pyridine ring.

The heterocyclic group can have a substituent group. Examples of the substituent groups include a halogen atom, nitro, a heterocyclic group, cyano, sulfo, an aryl group, —O—R, —S—R, —CO—R, —CO—O—R, —O—CO—R, —SO—R, —SO$_2$—R, —NR$^2$, —NH—CO—R, —NH—SO$_2$—R, —CO—NR$_2$, —SO$_2$—NR$_2$, —NH—CO—O—R and —NH—CO—NR$_2$. R is hydrogen, an alkyl group, a substituted alkyl group, an alkenyl group, a substituted alkenyl group or an aryl group.

(II)

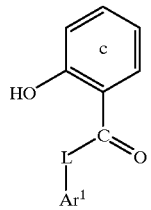

In the formula (II), Ar$^1$ is an aryl group or an aromatic heterocyclic group. Ar$^1$ preferably is an aryl group.

The aromatic heterocyclic group preferably has a five-membered or six-membered heterocyclic ring. Examples of the aromatic heterocyclic groups include furan ring, thiophene ring, indole ring, pyrrole ring, pyrazole ring, imidazole ring and pyridine ring.

The aromatic heterocyclic group can have a substituent group. Examples of the substituent groups include a halogen atom, nitro, a heterocyclic group, cyano, sulfo, an aryl group, —O—R, —S—R, —CO—R, —CO—O—R, —O—CO—R, —SO—R, —SO$_2$—R, —NR$^2$, —NH—CO—R, —NH—SO$_2$—R, —CO—NR$_2$, —SO$_2$—NR$_2$, —NH—CO—O—R and —NH—CO—NR$^2$. R is hydrogen, an alkyl group, a substituted alkyl group, an alkenyl group, a substituted alkenyl group or an aryl group.

In the formula (II), —L— is a single bond or —O—, and preferably is a single bond.

In the formula (II), the benzene ring c may have a substituent group.

Examples of the substituent groups include a halogen atom (F, Cl, Br), nitro, cyano, sulfo, an alkyl group, a substituted alkyl group, an alkenyl group, a substituted alkenyl group, an aryl group, a heterocyclic group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. R is hydrogen, an alkyl group, a substituted alkyl group, an alkenyl group, a substituted alkenyl group or an aryl group.

(III)

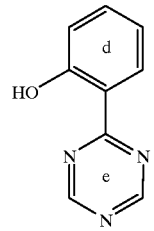

In the formula (III), the benzene ring d and the triazine ring e may have a substituent group.

Examples of the substituent groups include a halogen atom (F, Cl, Br), nitro, cyano, sulfo, an alkyl group, a substituted alkyl group, an alkenyl group, a substituted alkenyl group, an aryl group, a heterocyclic group, —O—R, —S—R, —CO—R, —CO—O—R, —O—CO—R, —SO—R, —SO$_2$—R, —NR$^2$, —NH—CO—R, —NH—SO$_2$—R, —CO—NR$^2$, —SO$_2$—NR$_2$, —NH—CO—O—R and —NH—CO—NR$_2$. R is hydrogen, an alkyl group, a substituted alkyl group, an alkenyl group, a substituted alkenyl group or an aryl group.

The substituent group of the triazine ring e preferably is an aryl group, more preferably is phenyl, and most preferably is o-hydroxyphenyl.

In the formula (III), the benzene ring d may be condensed with another aromatic ring or a heterocyclic ring. Examples of the aromatic rings include benzene ring and naphthalene ring. Examples of the heterocyclic rings include furan ring, thiophene ring, indole ring, pyrrole ring, pyrazole ring, imidazole ring and pyridine ring.

(IV)

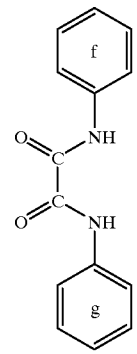

In the formula (IV), the benzene rings f and g may have a substituent group.

Examples of the substituent groups include a halogen atom (F, Cl, Br), nitro, cyano, sulfo, an alkyl group, a substituted alkyl group, an alkenyl group, a substituted alkenyl group, an aryl group, a heterocyclic group, —O—R, —S—R, —CO—R, —CO—O—R, —O—CO—R, —SO—R, —SO$_2$—R, —NR$^2$, —NH—CO—R, —NH—SO$_2$—R, —CO—NR$_2$, —SO$_2$—NR$_2$, —NH—CO—O—R and —NH—CO—NR$_2$. R is hydrogen, an alkyl group, a substituted alkyl group, an alkenyl group, a substituted alkenyl group or an aryl group.

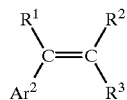

(V)

In the formula (V), Ar$^2$ is an aryl group or an aromatic heterocyclic group.

The aromatic heterocyclic group preferably has a five-membered or six-membered heterocyclic ring. Examples of the aromatic heterocyclic groups include furan ring, thiophene ring, indole ring, pyrrole ring, pyrazole ring, imidazole ring and pyridine ring.

The aromatic heterocyclic group can have a substituent group. Examples of the substituent groups include a halogen atom, nitro, a heterocyclic group, cyano, sulfo, an aryl group, —O—R, —S—R, —CO—R, —CO—O—R, —O—CO—R, —SO—R, —SO$_2$—R, —NR$^2$, —NH—CO—R, —NH—SO$_2$—R, —CO—NR$_2$, —SO$_2$—NR$_2$, —NH—CO—O—R and —NH—CO—NR$_2$. R is hydrogen, an alkyl group, a substituted alkyl group, an alkenyl group, a substituted alkenyl group or an aryl group.

In the formula (V), R$^1$ is hydrogen or an alkyl group.

In the formula (V), each of R$^2$ and R$^3$ independently is cyano, —COR$^{13}$, —COOR$^{14}$, —CONR$^{15}$R$^{16}$, —SO$_2$R$^{17}$ or —SO$_2$NR$^{18}$R$^{19}$. Each of R$^{13}$, R$^{14}$, R$^{15}$, R$^{16}$, R$^{17}$, R$^{18}$ and R$^{19}$ independently is hydrogen, an alkyl group, a substituted alkyl group or an aryl group. R$^2$ and R$^3$ can be combined to form a five-membered or six-membered ring.

At least one of R$^{15}$ and R$^{16}$ preferably is hydrogen. At least one of R$^{18}$ and R$^{19}$ preferably is hydrogen.

The five-membered or six-membered ring formed by combining R$^2$ and R$^3$ preferably functions as an acidic nucleus of a methine dye. Examples of the five-membered or six-membered rings, which can function as acidic nuclei, include 2-pyrazoline-5-one ring, pyrazolidine-2,4-dione ring, rhodanine ring, hydantoin ring, 2-thiohydantoin ring, 4-thiohydantoin ring, 2,4-oxazolidinedione, isooxazolone ring, barbituric acid ring, thiobarbituric acid ring, indanedione ring, hydroxypyridone ring, furanone ring, 1,3-cyclohexanedione ring and meldramic acid ring.

The five-membered or six-membered ring can have a substituent group. Examples of the substituent groups include a halogen atom, nitro, a heterocyclic group, cyano, sulfo, an aryl group, —O—R, —S—R, —CO—R, —CO—O—R, —O—CO—R, —SO—R, —SO$_2$—R, —NR$^2$, —NH—CO—R, —NH—SO$_2$—R, —CO—NR$_2$, —SO$_2$—NR$_2$, —NH—CO—O—R and —NH—CO—NR$_2$. R is hydrogen, an alkyl group, a substituted alkyl group, an alkenyl group, a substituted alkenyl group or an aryl group.

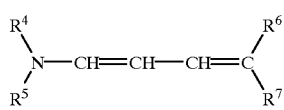

(VI)

In the formula (VI), each of R$^4$ and R$^5$ independently is hydrogen, an alkyl group or an aryl group, or R$^4$ and R$^5$ are combined to form a five-membered or six-membered ring.

Examples of the five-membered or six-membered rings include pyrrolidine ring, piperidine ring and morpholine ring.

The five-membered or six-membered ring can have a substituent group. Examples of the substituent groups include a halogen atom, nitro, a heterocyclic group, cyano, sulfo, an aryl group, —O—R, —S—R, —CO—R, —CO—O—R, —O—CO—R, —SO—R, —SO$_2$—R, —NR$^2$, —NH—CO—R, —NH—SO$_2$—R, —CO—NR$_2$, —SO$_2$—NR$^2$, —NH—CO—O—R and —NH—CO—NR$_2$. R is hydrogen, an alkyl group, a substituted alkyl group, an alkenyl group, a substituted alkenyl group or an aryl group.

In the formula (VI), each of R$^6$ and R$^7$ independently is cyano, —COR$^{20}$, —COOR$^{21}$, —CONR$^{22}$R$^{23}$, —SO$_2$R$^{24}$ or—SO$_2$NR$^{25}$R$^{26}$. Each of R$^{20}$, R$^{21}$, R$^{22}$, R$^{23}$, R$^{24}$, R$^{25}$ and R$^{26}$ independently is hydrogen, an alkyl group, a substituted alkyl group or an aryl group. R$^6$ and R$^7$ can be combined to form a five-membered or six-membered ring.

At least one of R$^{22}$ and R$^{23}$ preferably is hydrogen. At least one of R$^{25}$ and R$^{26}$ preferably is hydrogen.

The five-membered or six-membered ring formed by combining R$^6$ and R$^7$ preferably functions as an acidic nucleus of a methine dye. Examples of the five-membered or six-membered rings, which can function as acidic nuclei, include 2-pyrazoline-5-one ring, pyrazolidine-2,4-dione ring, rhodanine ring, hydantoin ring, 2-thiohydantoin ring, 4-thiohydantoin ring, 2,4-oxazolidinedione, isooxazolone ring, barbituric acid ring, thiobarbituric acid ring, indanedione ring, hydroxypyridone ring, furanone ring, 1,3-cyclohexanedione ring and meldramic acid ring.

The five-membered or six-membered ring can have a substituent group. Examples of the substituent groups include a halogen atom, nitro, a heterocyclic group, cyano, sulfo, an aryl group, —O—R, —S—R, —CO—R, —CO—O—R, —O—CO—R, —SO—R, —SO$_2$—R, —NR$^2$, —NH—CO—R, —NH—SO$_2$—R, —CO—NR$_2$, —SO$_2$—NR$_2$, —NH—CO—O—R and —NH—CO—NR$_2$. R is hydrogen, an alkyl group, a substituted alkyl group, an alkenyl group, a substituted alkenyl group or an aryl group.

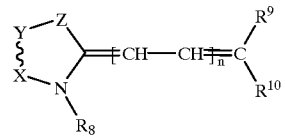

(VIII)

In the formula (VII), R$^8$ is an alkyl group, a substituted alkyl group or an aryl group.

In the formula (VII), each of R$^9$ and R$^{10}$ independently is cyano, —COR$^{27}$, —COOR$^{28}$, —CONR$^{29}$R$^{30}$, —SO$_2$R$^{31}$ or —SO$_2$NR$^{32}$R$^{33}$. Each of R$^{27}$, R$^{28}$, R$^{29}$, R$^{30}$, R$^{31}$, R$^{32}$ and R$^{33}$ independently is hydrogen, an alkyl group, a substituted alkyl group or an aryl group. R$^9$ and R$^{10}$ can be combined to form a five-membered or six-membered ring.

At least one of R$^{29}$ and R$^{30}$ preferably is hydrogen. At least one of R$^{32}$ and R$^{33}$ preferably is hydrogen.

The five-membered or six-membered ring formed by combining R$^9$ and R$^{10}$ preferably functions as an acidic nucleus of a methine dye. Examples of the five-membered or six-membered rings, which can function as acidic nuclei, include 2-pyrazoline-5-one ring, pyrazolidine-2,4-dione ring, rhodanine ring, hydantoin ring, 2-thiohydantoin ring, 4-thiohydantoin ring, 2,4-oxazolidinedione, isooxazolone ring, barbituric acid ring, thiobarbituric acid ring, inanedione ring, hydroxypyridone ring, furanone ring, 1,3-cyclohexanedione ring and meldramic acid ring.

The five-membered or six-membered ring can have a substituent group. Examples of the substituent groups include a halogen atom, nitro, a heterocyclic group, cyano, sulfo, an aryl group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$_2$, —NH—CO—O—R and —NH—CO—NR$_2$. R is hydrogen, an alkyl group, a substituted alkyl group, an alkenyl group, a substituted alkenyl group or an aryl group.

In the formula (VII), —X~Y— is —CR$^{34}$R$^{35}$—CR$^{36}$R$^{37}$— or —CR$^{38}$=CR$^{39}$—. Each of R$^{34}$, R$^{35}$, R$^{36}$, R$^{37}$, R$^{38}$ and R$^{39}$ independently is hydrogen, an alkyl group or an aryl group. R$^{38}$ and R$^{39}$ can be combined to form a benzene or naphthalene ring.

In the formula (VII), —Z— is —O—, —S—, —NR$^{40}$—, —CR$^{41}$R$^{42}$— or —CH=CH—. R$^{40}$ is an alkyl group, a substituted alkyl group or an aryl group. Each of R$^{41}$ and R$^{42}$ independently is hydrogen or an alkyl group.

In the formula (VII), n is 0 or 1.

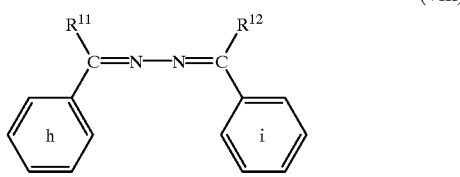

(VIII)

In the formula (VIII), each of R$^{11}$ and R$^{12}$ independently is hydrogen, an alkyl group or an aryl group. R$^{11}$ and R$^{12}$ can be combined to form a five-membered or six-membered ring.

In the formula (VIII), the benzene rings h and i may have a substituent group.

Examples of the substituent groups include a halogen atom (F, Cl, Br), nitro, cyano, sulfo, an alkyl group, a substituted alkyl group, an alkenyl group, a substituted alkenyl group, an aryl group, a heterocyclic group, —O—R, —S—R, —CO—R, —CO—O—R, —O—CO—R, —SO—R, —SO$_2$—R, —NR$_2$, —NH—CO—R, —NH—SO$_2$—R, —CO—NR$_2$, —SO$_2$—NR$^2$, —NH—CO—O—R and —NH—CO—NR$_2$. R is hydrogen, an alkyl group, a substituted alkyl group, an alkenyl group, a substituted alkenyl group or an aryl group.

In the formula (VIII), the benzene rings h and i may be condensed with another aromatic ring or a heterocyclic ring. Examples of the aromatic rings include benzene ring and naphthalene ring. Examples of the heterocyclic rings include furan ring, thiophene ring, indole ring, pyrrole ring, pyrazole ring, imidazole ring and pyridine ring.

The ultraviolet absorbing agent preferably is a compound represented by the formula (I), (II), (III) or (IV), more preferably is an o-substituted phenol represented by the formula (I), (II) or (III), and most preferably is an o-substituted phenol represented by the formula (I) or (III).

Examples of the compounds represented by the formula (I), (II), (III), (IV), (V), (VI), (VII) and (VIII) are shown below.

(I-1)–(I-13)

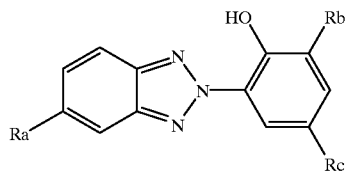

| | Ra: | Rb: | Rc: |
|---|---|---|---|
| (I-1) | —H, | —H, | -t-C$_8$H$_{17}$ |
| (I-2) | —H, | -t-C$_4$H$_9$, | —CH$_2$CH$_2$COOC$_8$H$_{17}$ |
| (I-3) | —H, | —C(CH$_3$)$_2$—Ph, | -t-C$_8$H$_{17}$ |
| (I-4) | —H, | —C(CH$_3$)$_2$—Ph, | —C(CH$_3$)$_2$—Ph |
| (I-5) | —H, | —H, | —CH$_3$ |
| (I-6) | —H, | -t-C$_5$H$_{11}$, | -t-C$_5$H$_{11}$ |
| (I-7) | —H, | -t-C$_5$H$_{11}$, | —H |
| (I-8) | —H, | —NHCOCH(CH$_3$)$_2$, | —CH$_3$ |
| (I-9) | —Cl, | -t-C$_4$H$_9$, | -t-C$_4$H$_9$ |
| (I-10) | —OCH$_3$, | -t-C$_4$H$_9$, | —CH$_3$ |
| (I-11) | —Cl, | -t-C$_4$H$_9$, | —CH$_2$CH$_2$COOC$_8$H$_{17}$ |
| (I-12) | —H, | —C$_{12}$H$_{25}$, | —CH$_3$ |
| (I-13) | —SC$_{12}$H$_{25}$, | -t-C$_4$H$_9$, | -t-C$_4$H$_9$ |
| (Remark) | Ph: Phenyl | | |

(I-14)

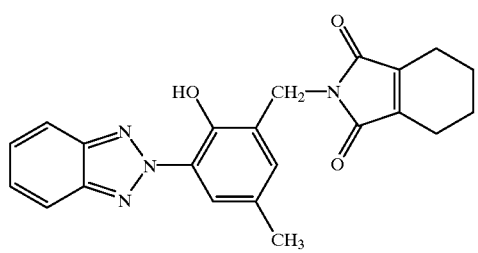

(I-15)

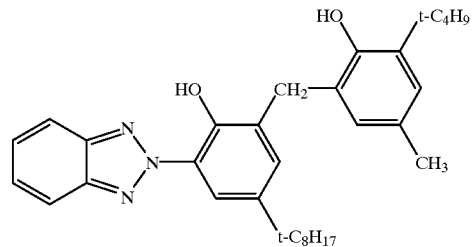
(I-16)
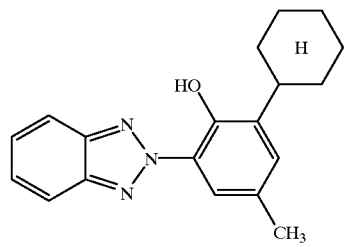
(I-17)
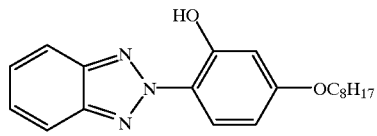
(I-18)
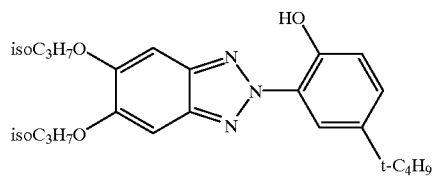
(I-19)
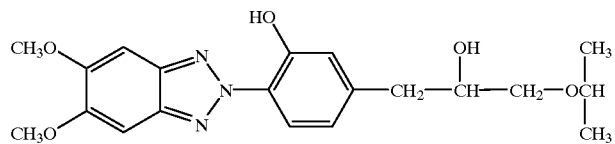
(I-20)
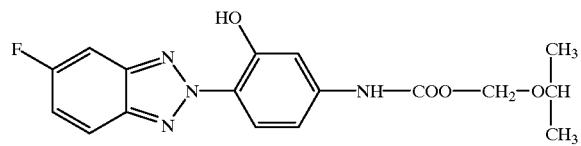
(I-21)
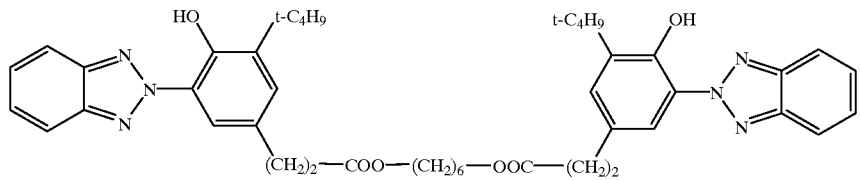
(II-1)–(II-8)

-continued
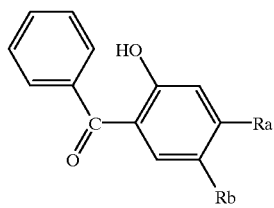
| | | | |
|---|---|---|---|
| (II-1) | Ra: —OCH₃, | Rb: —H | |
| (II-2) | Ra: —OC₈H₁₇, | Rb: —H | |
| (II-3) | Ra: —OCH₂—Ph, | Rb: —H | |
| (II-4) | Ra: —OCH₂—COO—C₂H₅, | Rb: —H | |
| (II-5) | Ra: —OH, | Rb: —CO—Ph | |
| (II-6) | Ra: —O—(CH₂)₃—COOH, | Rb: —H | |
| (II-7) | Ra: —OH, | Rb: —H | |
| (II-8) | Ra: —OCH₃, | Rb: —SO₃H | |
| (Remark) | Ph: Phenyl | | |
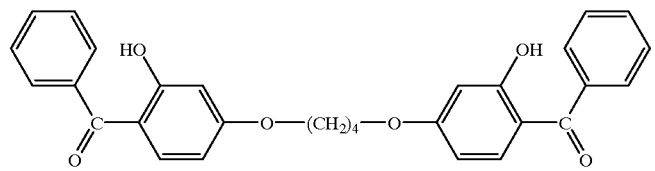
(II-9)
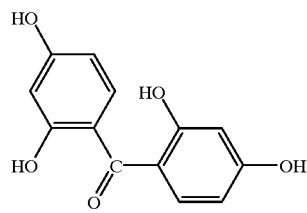
(II-10)
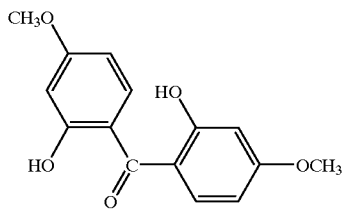
(II-11)
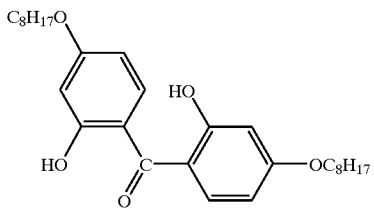
(II-12)
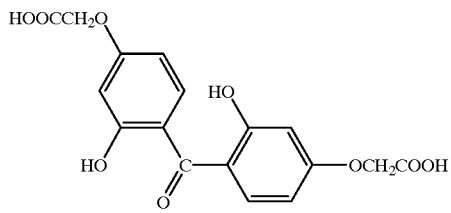
(II-13)

-continued
(II-14)
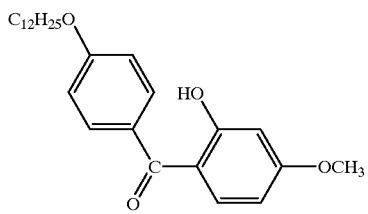
(II-15)
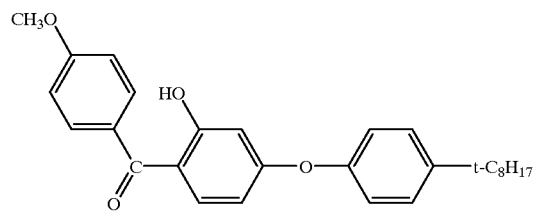
(II-16)
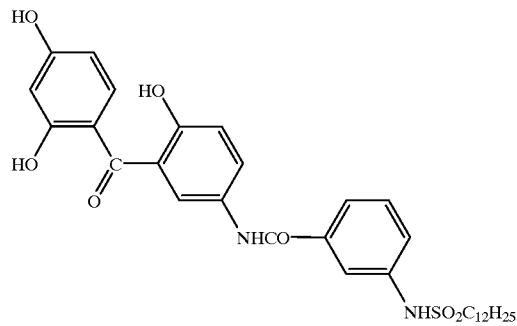
(II-17)
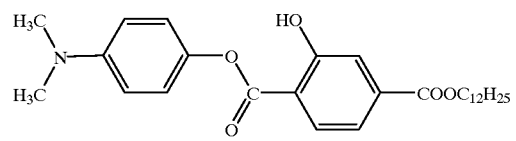
(II-18)
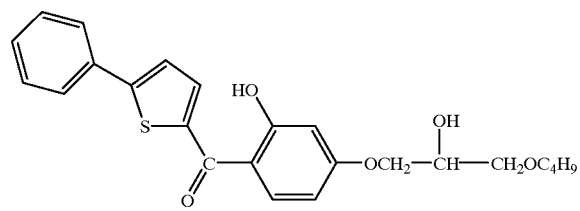
(III-1)
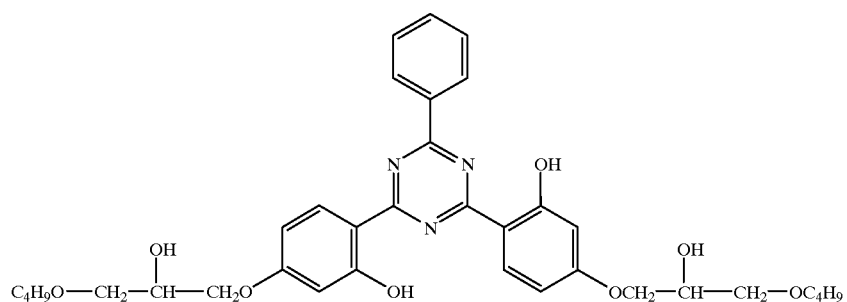

-continued
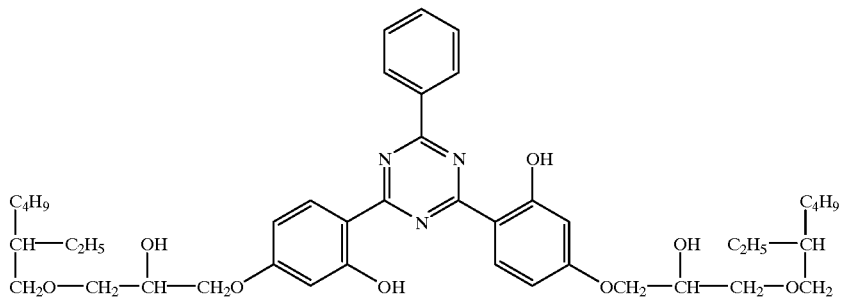
(III-2)
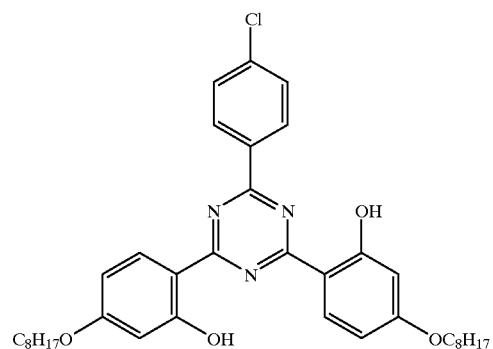
(III-3)
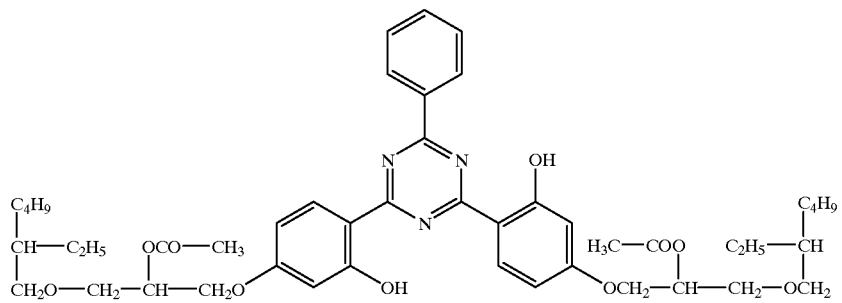
(III-4)
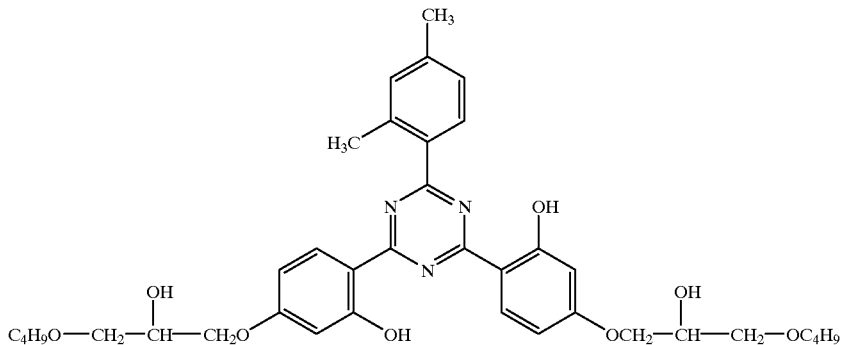
(III-5)
(III-6)

-continued
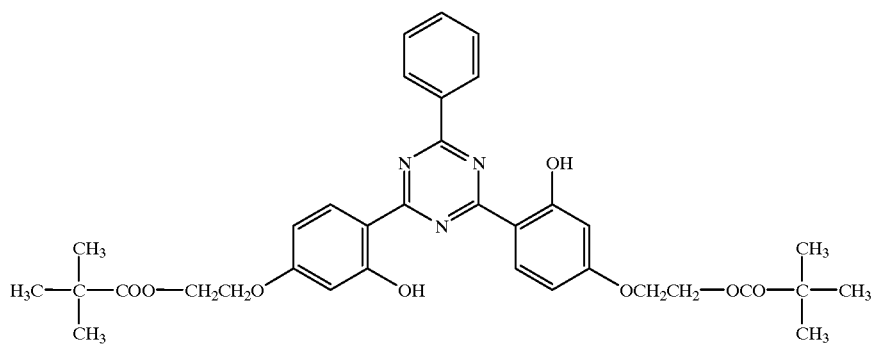
(III-7)
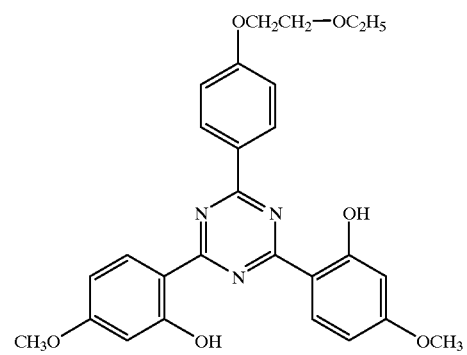
(III-8)
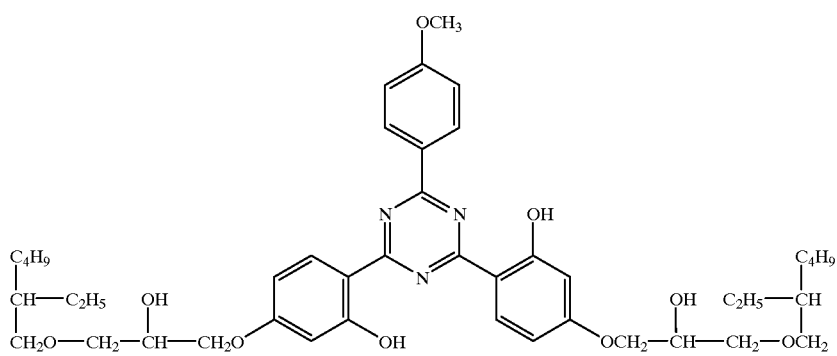
(III-9)
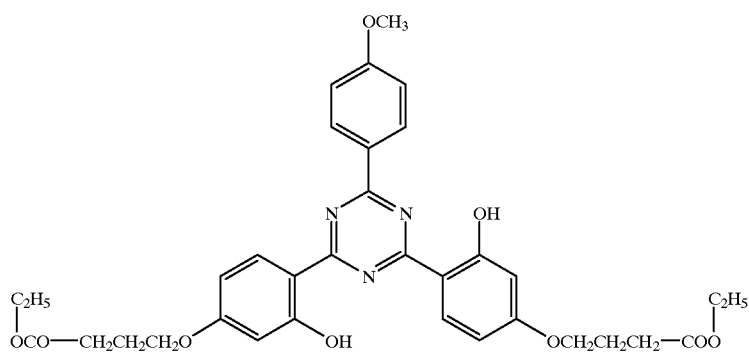
(III-10)

-continued
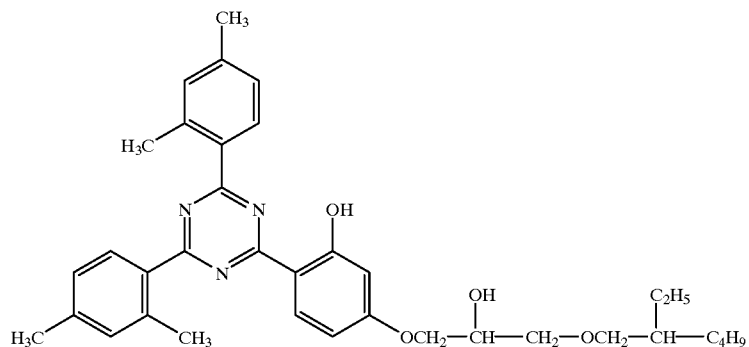
(III-11)
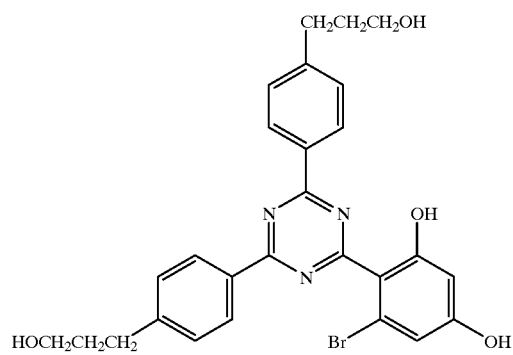
(III-12)
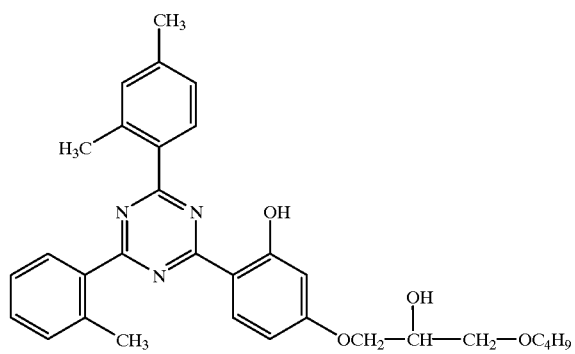
(III-13)

-continued
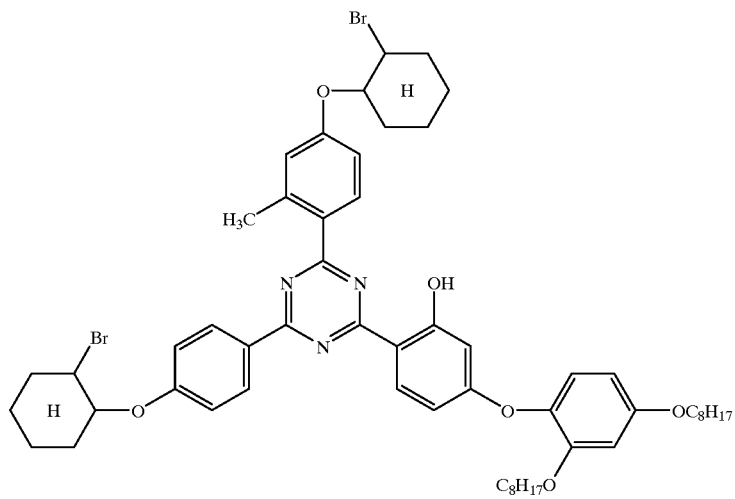
(III-14)
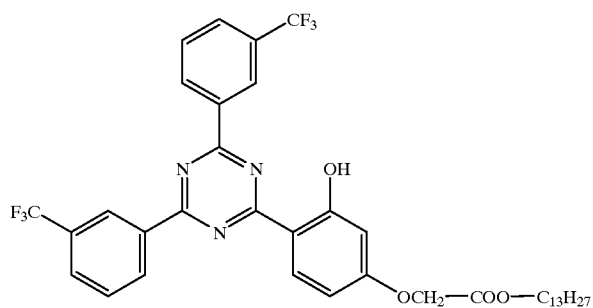
(III-15)
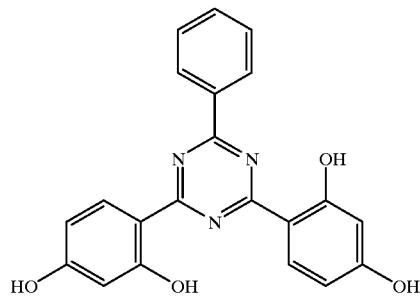
(III-16)
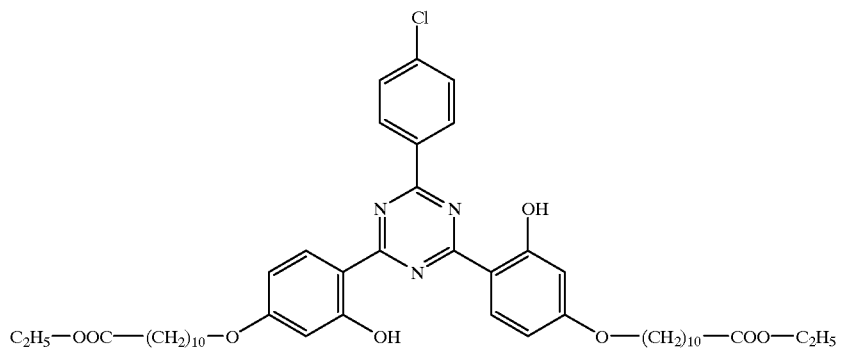
(III-17)

-continued
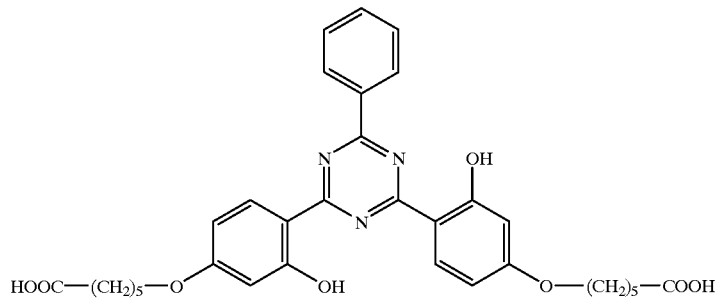
(III-18)
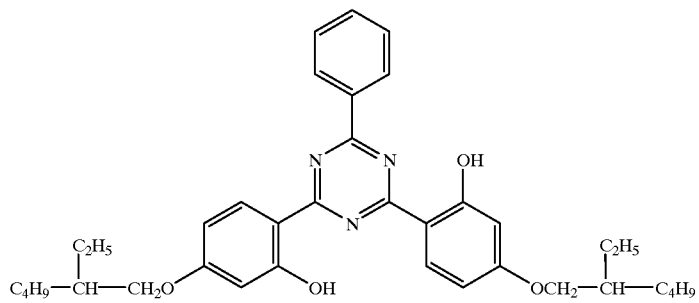
(III-19)
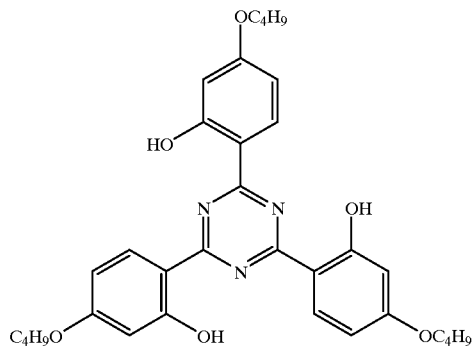
(III-20)
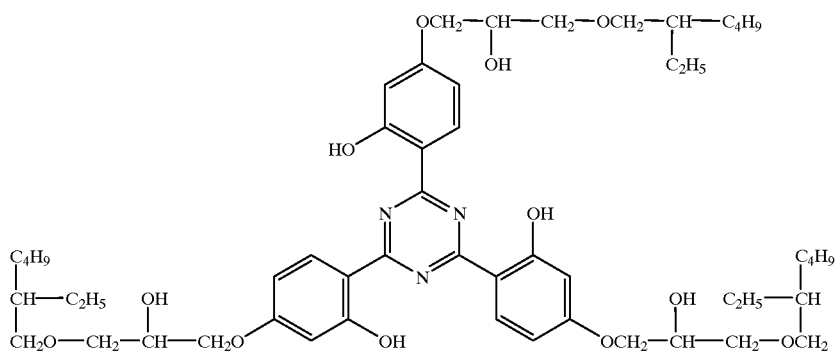
(III-21)

-continued
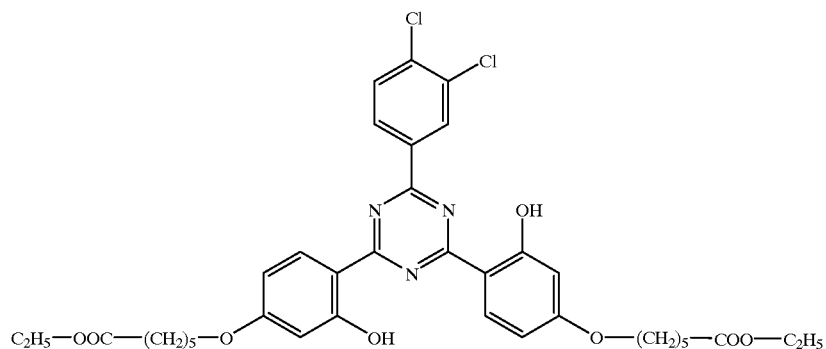
(III-22)
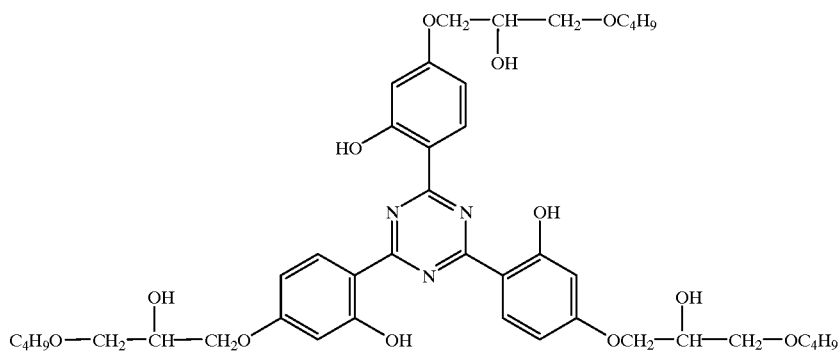
(III-23)
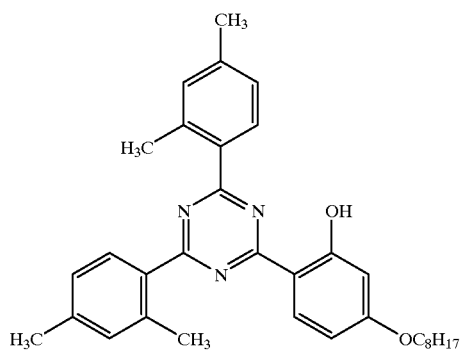
(III-24)
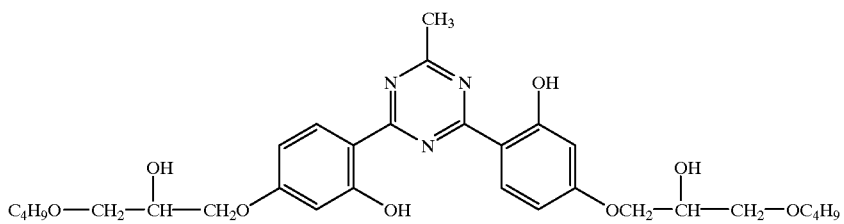
(III-25)

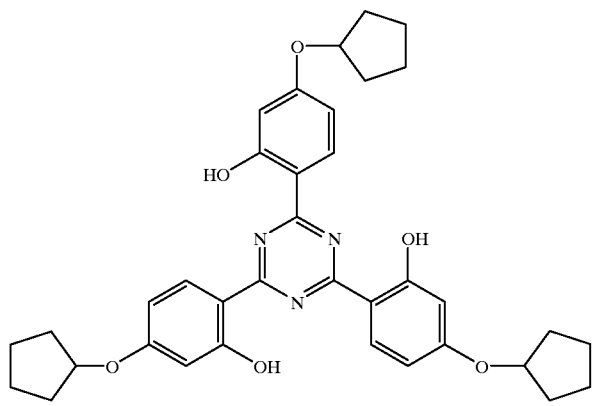
(III-26)
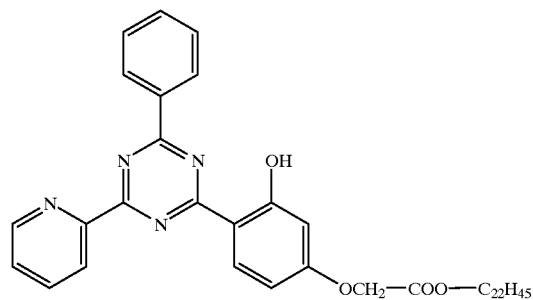
(III-27)
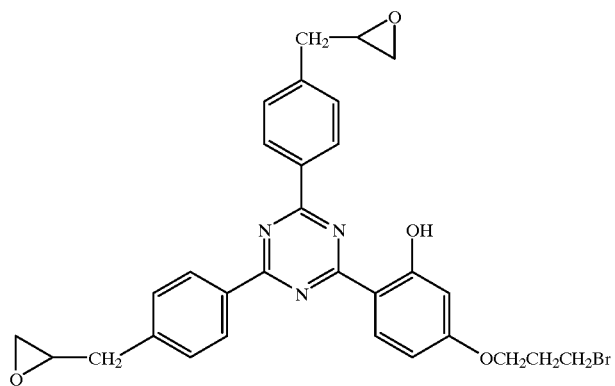
(III-28)
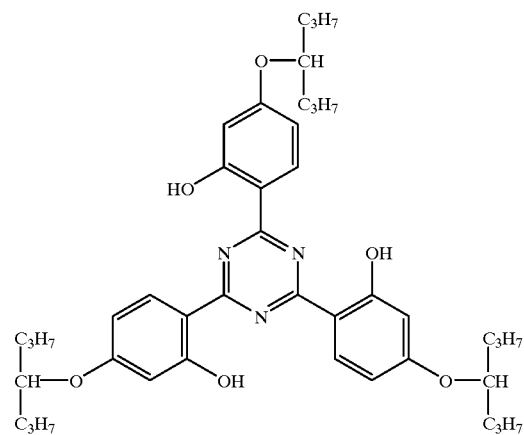

(III-29)
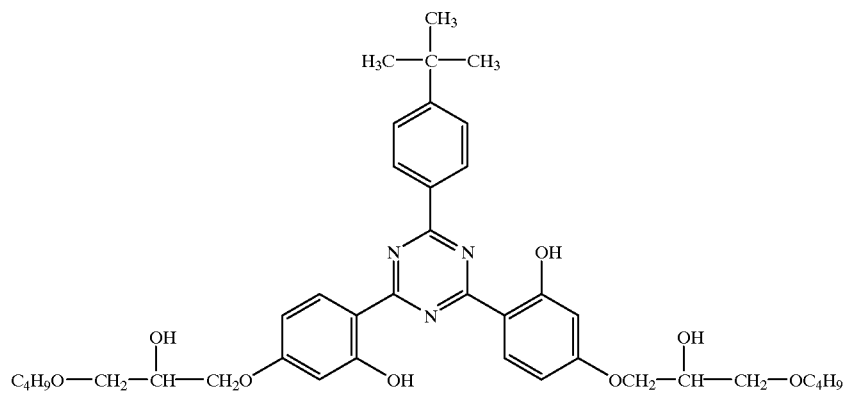
(III-30)
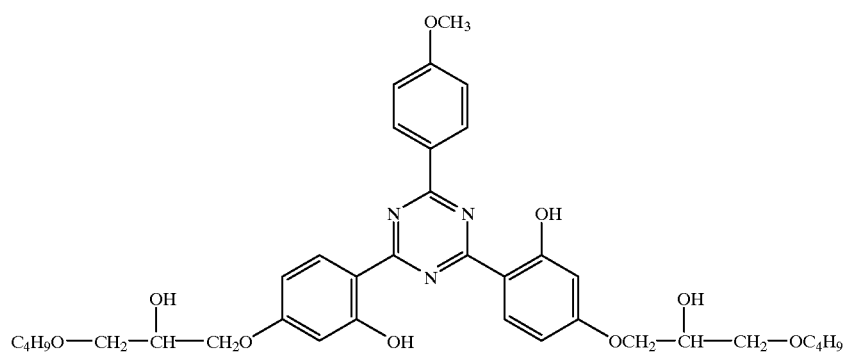
(III-31)
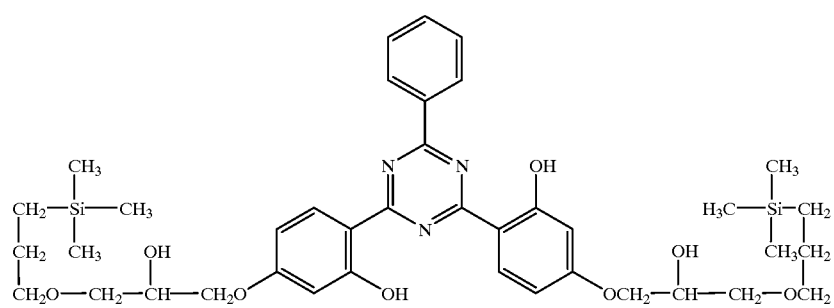
(III-32)
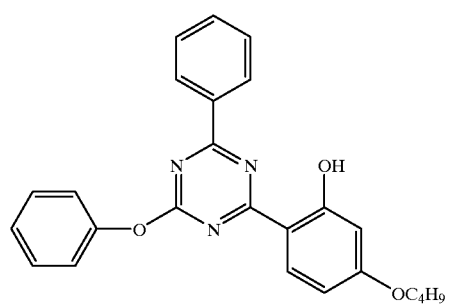
(III-33)

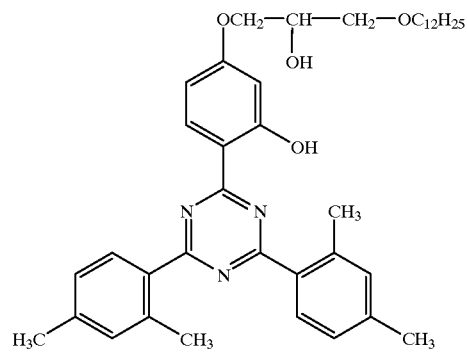
(III-34)
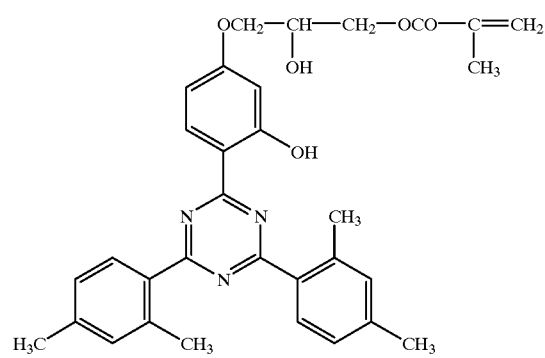
(III-35)
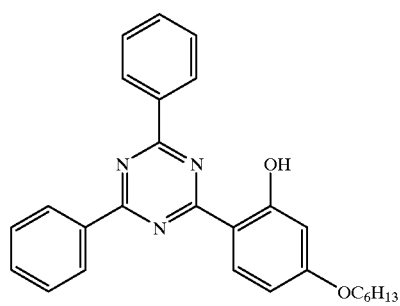
(III-36)
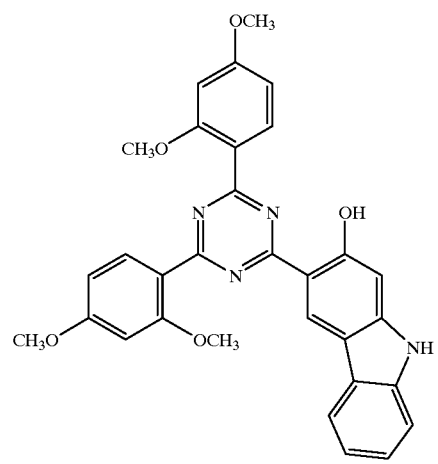
(III-37)

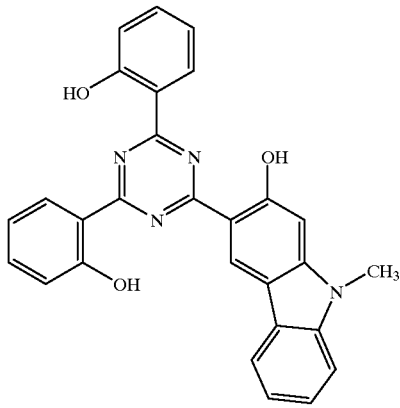
(III-38)
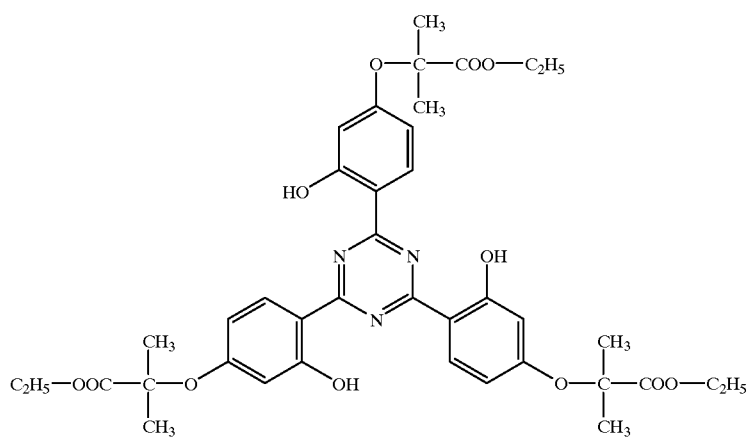
(III-39)
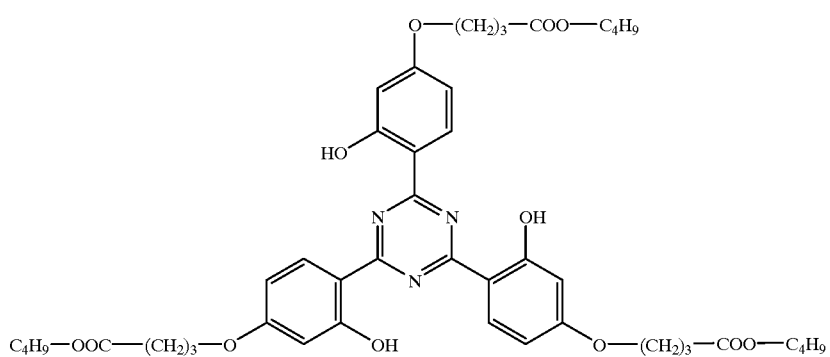
(III-40)

-continued
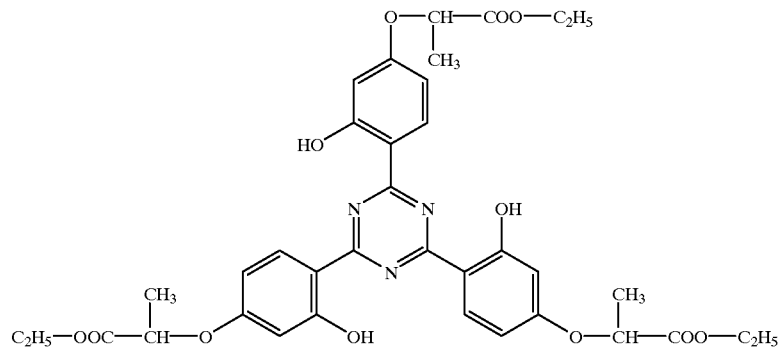
(III-41)
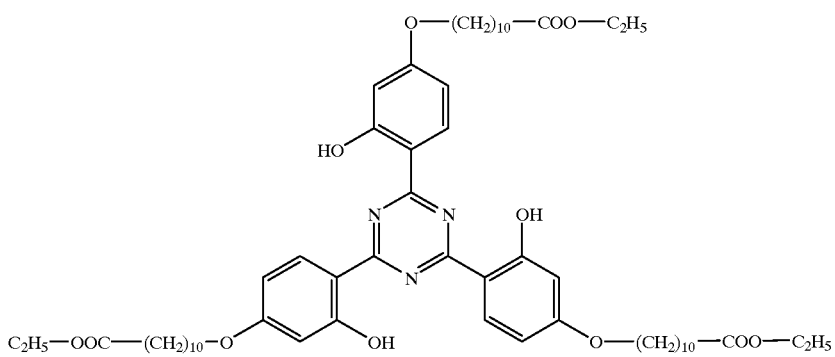
(III-42)–(III-50)
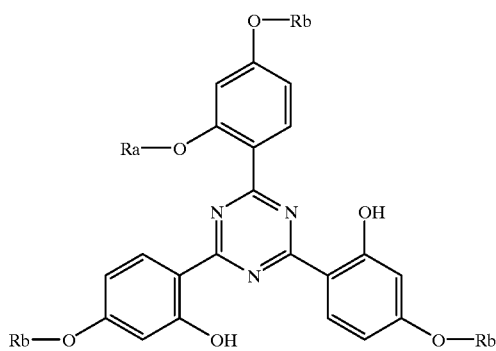
| | Ra: | | Rb: |
|---|---|---|---|
| (III-42) | —C₂H₅, | | —CH₂—CHOH—CH₂—OC₄H₉ |
| (III-43) | —CH₂—CHOH—CH₂—OC₄H₉, | | —CH₂—CHOH—CH₂—OC₄H₉ |
| (III-44) | —C₂H₅, | | —CH(CH₃)—COO—C₂H₅ |
| (III-45) | —CH(CH₃)—COO—C₂H₅, | | —CH(CH₃)—COO—C₂H₅ |
| (III-46) | —CH₂—CH(C₂H₅)—C₄H₉, | | —CH₂—CH(C₂H₅)—C₄H₉ |
| (III-47) | —C₄H₉, | | —C₄H₉ |
| (III-48) | —CH₂—COO—C₂H₅, | | —CH₂—COO—C₂H₅ |
| (III-49) | —C₂H₅, | | —C₈H₁₇ |
| (III-50) | —C₂H₅, | | —CH₂—COO—C₂H₅ |
(IV-1)
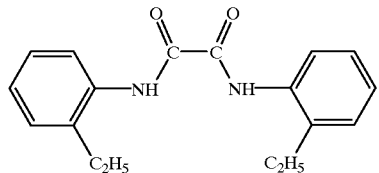
(IV-2)

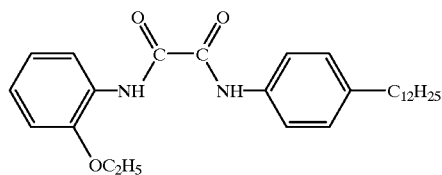
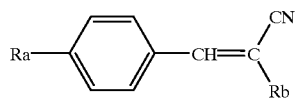
(V-1)–(V-4)
| | | | |
|---|---|---|---|
| (V-1) | Ra: —OCH$_3$, | Rb: | —COOH |
| (V-2) | Ra: —OCH$_3$, | Rb: | —COONa |
| (V-3) | Ra: —OCH$_3$, | Rb: | —COO—C$_{10}$H$_{21}$ |
| (V-4) | Ra: —CH$_3$, | Rb: | —COO—C$_{12}$H$_{25}$ |
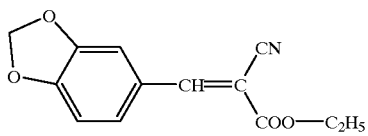
(V-5)
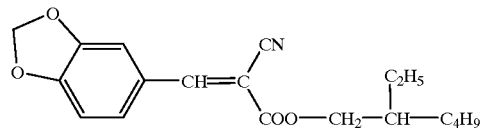
(V-6)
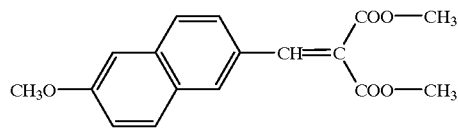
(V-7)
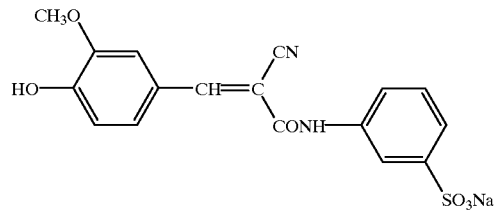
(V-8)
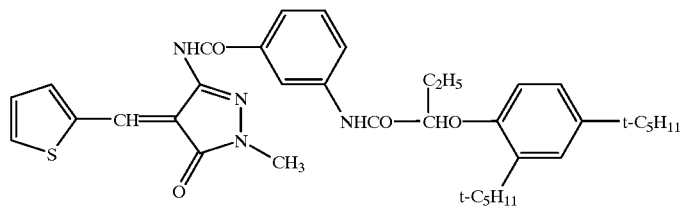
(V-9)
(V-10)

-continued
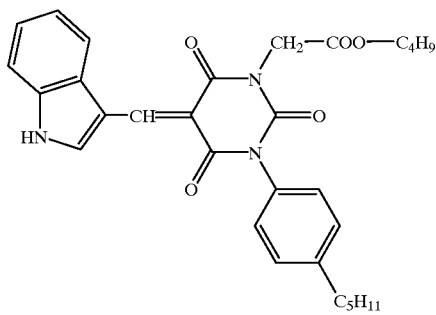
(V-11)
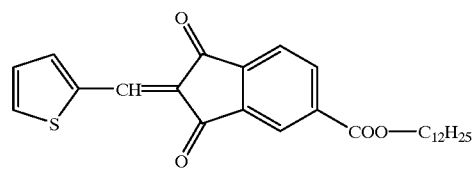
(V-12)
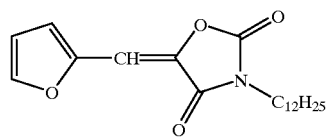
(VI-1)
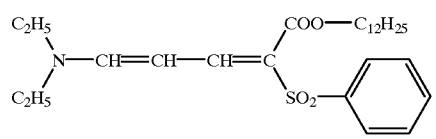
(VI-2)
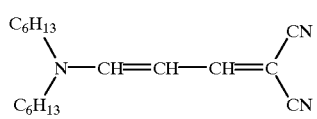
(VI-3)
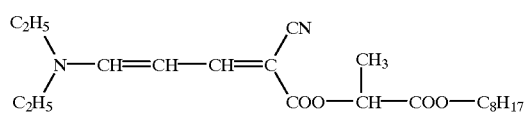
(VI-4)
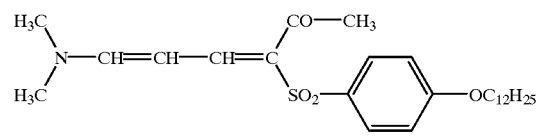
(VI-5)
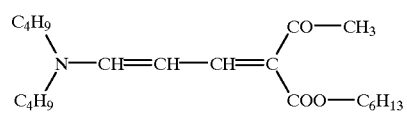
(VI-6)

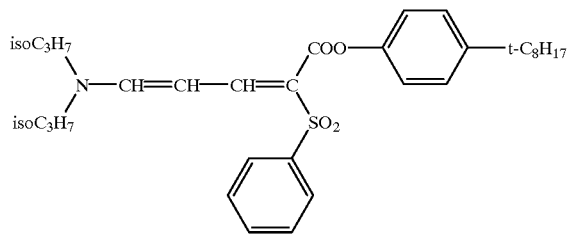
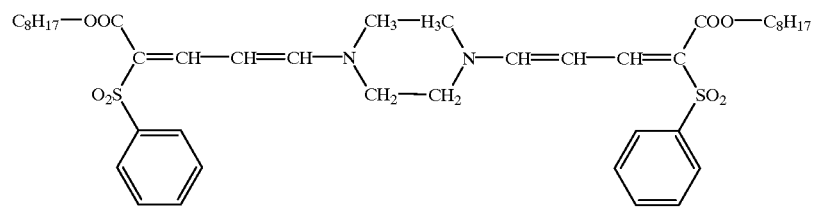
(VI-7)
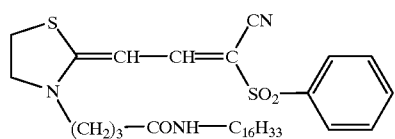
(VII-1)
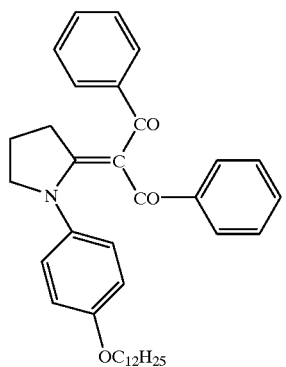
(VII-2)
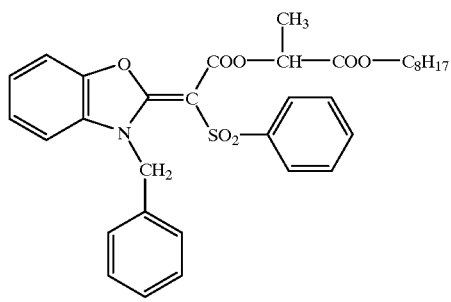
(VII-3)
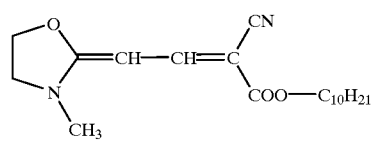
(VII-4)
(VII-5)

-continued
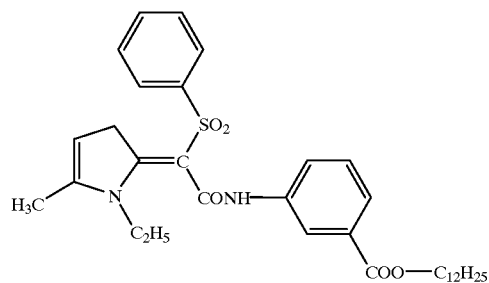
(VII-6)
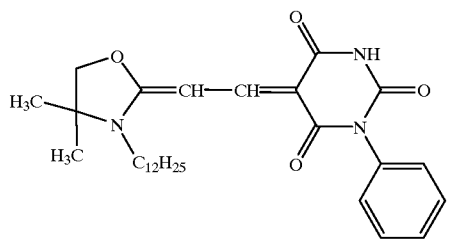
(VII-7)
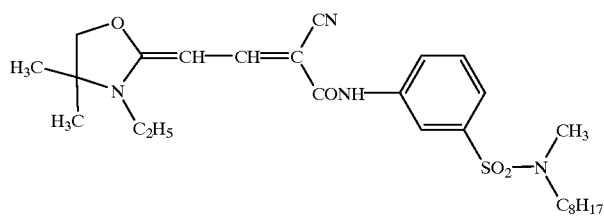
(VII-8)
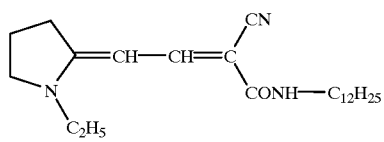
(VIII-1)
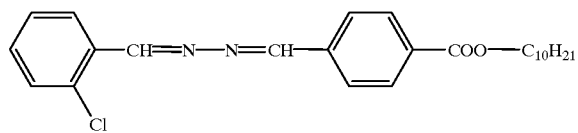
(VIII-2)
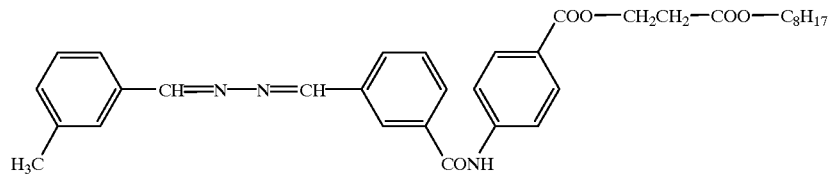
(VIII-3)
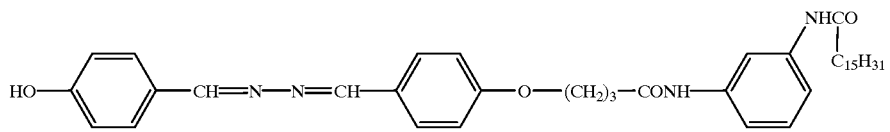

The compounds represented by the formula (I), (II), (III), (IV), (V), (VI), (VII) or (VIII) can be synthesized by referring to various documents (Japanese Patent Publication Nos. 36(1961)-10466, 48(1973)-5496, 48(1973)-30492, 55(1980)-36984, 55(1980)-125875, Japanese Patent Provisional Publication Nos. 46(1971)-3335, 47(1972)-10537, 51(1976)-56620, 53(1978)-128333, 58(1983)-181040, 58(1983)-214152, 58(1983)-221844, 59(1984)-19945, 63(1988)-53544, 6(1994)-211813, 7(1995)-258228, 8(1996)-53427, 8(1996)239368, 10(1998)-115898, 10(1998)-147577, 10(1998)-182621, 8(1996)-501291, U.S. Pat. Nos. 2,719,086, 3,698,707, 3,707,375, 3,754,919, 4,220,711, 5,298,380, 5,500,332, 5,585,228, 5,814,438, British Patent No. 1,198,337, European Patent Nos. 323408A, 520938A, 521823a, 530135A, 531258A).

The structure, physical property and function of a representative ultraviolet absorbing agent is described in Andreas Valet, Light Stabilizers for Paint, Vincents.

A polymer having repeating units containing a chemical structure corresponding to the formula (I), (II), (III), (IV), (V), (VI), (VII) or (VIII) can also be used as an ultraviolet absorbing agent.

Examples of the repeating units containing a chemical structure corresponding to the formula (I), (II), (III), (V) or (VI) are shown below.

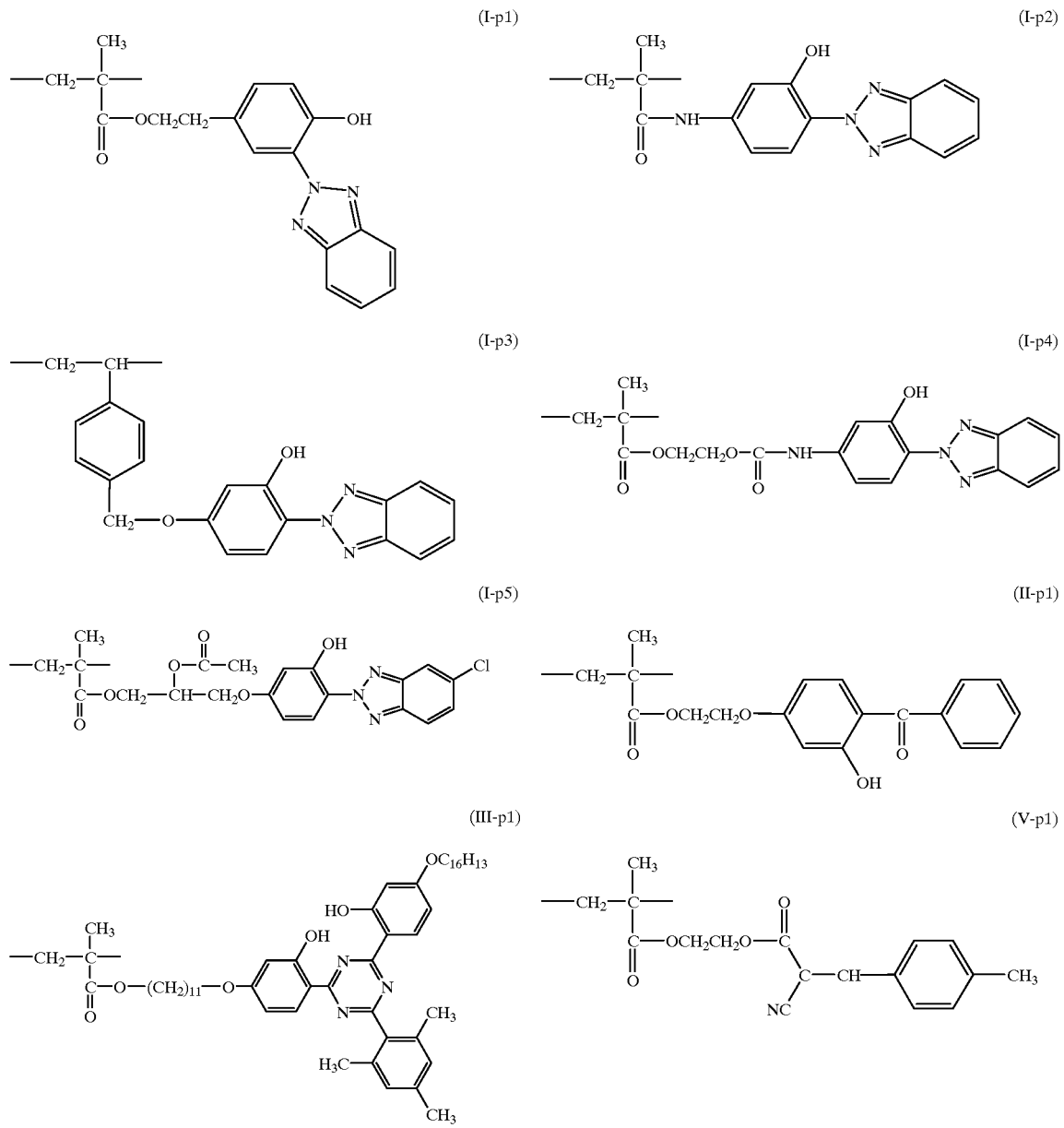

-continued

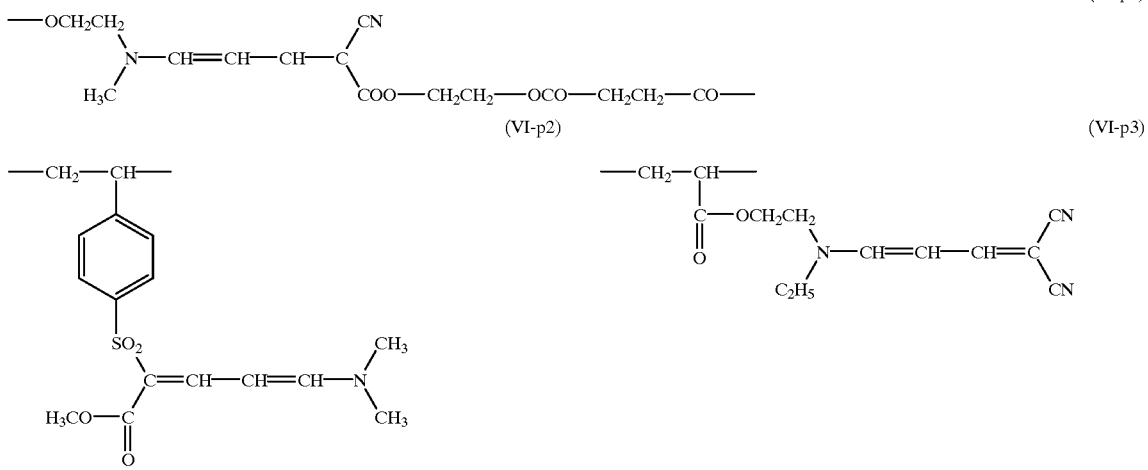

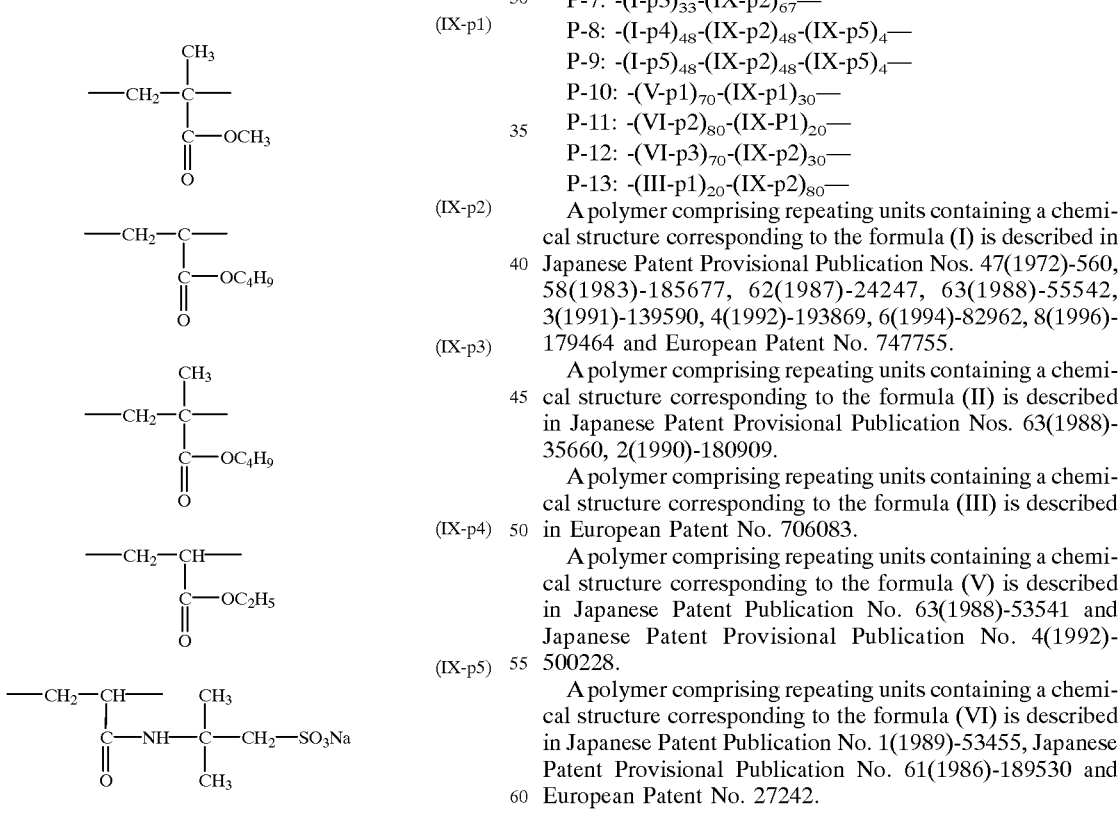

A homopolymer consisting of the above-described repeating unit can be used as the ultraviolet absorbing agent. A copolymer comprising two or more repeating units can also be used as the ultraviolet absorbing agent. Further, a copolymer comprising another repeating unit can be used as the ultraviolet absorbing agent. Examples of the other repeating units are shown below.

Examples of the copolymers comprising the repeating units containing a chemical structure corresponding to the formula (I), (II), (III), (V) or (VI) and the other repeating units are shown below. In the following examples, the number corresponds to the above-described repeating unit. The ratio of the repeating unit means mol %.

P-1: -(II-p1)$_{50}$-(IX-p1)$_{50}$—
P-2: -(II-p1)$_{30}$-(IX-p1)$_{70}$—
P-3: -(II-p1)$_{10}$-(IX-p1)$_{70}$-(IX-p2)$_{20}$—
P-4: -(II-p1)$_{10}$-(IX-p1)$_{50}$-(IX-p2)$_{40}$—
P-5: -(I-p1)$_{50}$-(IX-p3)$_{50}$—
P-6: -(I-p2)$_{32}$-(IX-p4)$_{65}$-(IX-p5)$_{3}$—
P-7: -(I-p3)$_{33}$-(IX-p2)$_{67}$—
P-8: -(I-p4)$_{48}$-(IX-p2)$_{48}$-(IX-p5)$_{4}$—
P-9: -(I-p5)$_{48}$-(IX-p2)$_{48}$-(IX-p5)$_{4}$—
P-10: -(V-p1)$_{70}$-(IX-p1)$_{30}$—
P-11: -(VI-p2)$_{80}$-(IX-P1)$_{20}$—
P-12: -(VI-p3)$_{70}$-(IX-p2)$_{30}$—
P-13: -(III-p1)$_{20}$-(IX-p2)$_{80}$—

A polymer comprising repeating units containing a chemical structure corresponding to the formula (I) is described in Japanese Patent Provisional Publication Nos. 47(1972)-560, 58(1983)-185677, 62(1987)-24247, 63(1988)-55542, 3(1991)-139590, 4(1992)-193869, 6(1994)-82962, 8(1996)-179464 and European Patent No. 747755.

A polymer comprising repeating units containing a chemical structure corresponding to the formula (II) is described in Japanese Patent Provisional Publication Nos. 63(1988)-35660, 2(1990)-180909.

A polymer comprising repeating units containing a chemical structure corresponding to the formula (III) is described in European Patent No. 706083.

A polymer comprising repeating units containing a chemical structure corresponding to the formula (V) is described in Japanese Patent Publication No. 63(1988)-53541 and Japanese Patent Provisional Publication No. 4(1992)-500228.

A polymer comprising repeating units containing a chemical structure corresponding to the formula (VI) is described in Japanese Patent Publication No. 1(1989)-53455, Japanese Patent Provisional Publication No. 61(1986)-189530 and European Patent No. 27242.

A polymer comprising repeating units containing a chemical structure corresponding to the formula (VII) is described in Japanese Patent Provisional Publication No. 63(1988)-53543.

A polymer comprising repeating units containing a chemical structure corresponding to another ultraviolet absorbing agent is described in Japanese Patent Provisional Publication Nos. 47(1972)-192, 61(1986)-169831, 63(1988)-53543, 63(1988)-53544, 63(1988)-56651, and European Patent No. 343246.

The ultraviolet absorbing agent can be incorporated into a structural element (layer or support) of an optical filter according to various methods. The ultraviolet absorbing agent can be directly added to a component of the element where the ultraviolet absorbing agent is miscible with the component. The ultraviolet absorbing agent can be dissolved in an auxiliary solvent, which is miscible with the component, and the solution can be added to the element. The ultraviolet absorbing agent can be dispersed in a high boiling point organic solvent or a polymer, and the dispersion can be added to the element.

The high boiling point organic solvent has a boiling point preferably of higher than 180° C., and more preferably of higher than 200° C. The melting point of the high boiling point organic solvent is preferably lower than 150° C., and more preferably lower than 100° C.

Examples of the high boiling point organic solvents include a phosphoric ester, a phosphonic ester, a benzoic ester, a phthalic ester, a fatty acid ester, a carbonic ester, amide, ether, a halogenated hydrocarbon, an alcohol and paraffin. A phosphoric ester, a phosphonic ester, a benzoic ester and a fatty acid ester are preferred.

The high boiling point organic solvent preferably has a refractive index similar to the refractive index of a binder (e.g., gelatin) of a layer to which the solvent and the ultraviolet absorbing agent are to be added. The refractive index of the solvent is preferably lower than 1.50, and more preferably in the range of 1.43 to 1.48.

The ultraviolet absorbing agent can be added to an optical filter by referring to Japanese Patent Provisional Publication Nos. 58(1983)-209735, 63(1988)-264748, 4(1992)-191851, 8(1996)-272058 and British Patent No. 2016017A.

Two or more ultraviolet absorbing agents can be used in combination. A combination of two (preferably three) ultraviolet absorbing agents can absorb an ultraviolet ray of a wide wavelength range. Further, the dispersion of the ultraviolet absorbing agent can be stabilized by using two or more ultraviolet absorbing agents in combination.

The amount of the ultraviolet absorbing agent is preferably in the range of 0.001 to 10 g/m$^2$, more preferably in the range of 0.05 to 5 g/m$^2$, and most preferably in the range of 0.1 to 2 g/m$^2$. The absorption of the ultraviolet ray at 360 nm is preferably more than 0.6, more preferably more than 1.0, and most preferably more than 1.5.

[Transparent support]

Examples of the materials for the support include cellulose esters (e.g., diacetyl cellulose, triacetyl cellulose, propionyl cellulose, butyryl cellulose, acetyl propionyl cellulose, nitrocellulose), polyamides, polycarbonates, polyesters (e.g., polyethylene terephthalate, polyethylene naphthalate, poly-1,4-cyclohexanedimethylene terephthalate, polyethylene-1,2-diphenoxyethane-4,4,-dicarboxylate, polybutylene terephthalate), polystyrenes (e.g., syndiotactic polystyrene), polyolefins (e.g., polypropylene, polyethylene, polymethylpentene), polymethyl methacrylate, syndiotactic polystyrene, polysulfone, polyethersulfone, polyetherketone, polyether imide and polyoxyethylene. Triacetyl cellulose (TAC), polycarbonates and polyethylene terephthalate are preferred.

The transparent support preferably has a transmittance of more than 80%, and more preferably more than 86%. The haze of the support is preferably in the range of less than 2.0%, and more preferably less than 1.0%. The support preferably has a refractive index of 1.45 to 1.70.

The support may contain an infrared absorbing agent. The amount of the infrared absorbing agent is preferably in the range of 0.01 to 20 wt. % and more preferably 0.05 to 10 wt. % based on the total weight of the support. The support may further contain particles of an inert inorganic compound as a slipping agent. Examples of the inorganic compound include $SiO_2$, $TiO_2$, $BaSO_4$, $CaCO_3$, talc and kaolin.

The support may be subjected to surface treatment. Examples of the surface treatment include chemical treatment, mechanical treatment, corona discharge treatment, flame treatment, UV treatment, high-frequency treatment, glow discharge treatment, active plasma treatment, laser treatment, mixed acid treatment and ozone-oxidation treatment. Preferred treatments are glow discharge treatment, UV treatment, corona discharge treatment and flame treatment. Glow discharge treatment and UV treatment are particularly preferred. For enhancing the adhesion between the support and the layer provided thereon, an undercoating layer may be provided on the support.

[Undercoating layer]

An undercoating layer is preferably provided between the transparent support and the filter layer.

The undercoating layer may contain a polymer having a glass transition temperature in the range of −60° C. to 60° C. or a polymer compatible with the polymer of the filter layer. On the support surface opposite to the filter layer side, another undercoating layer may be provided to enhance the adhesion between the support and the layers thereon (e.g., anti-reflection layers, hard coating layer). Further, another undercoating layer can be provided to improve the affinity between the optical filter and the adhesive agent for fixing the optical filter onto a display device.

The undercoating layer has a thickness preferably in the range of 2 nm to 20 μm more in the range of 5 nm to 5 μm, and most preferably in the range of 50 nm to 5 μm.

The undercoating layer containing a polymer having a glass transition temperature in the range of −60° C. to 60° C. unites the filter layer to the transparent support with the adhesion of the polymer. The polymer having a glass transition temperature in the range of −60° C. to 60° C. can be prepared by polymerization or copolymerization of vinyl chloride, vinylidene chloride, vinyl acetate, butadiene, neoprene, styrene, chloroprene, acrylic ester, methacrylic ester, acrylonitrile or methyl vinyl ether. The glass transition temperature is preferably not higher than 20° C., more preferably not higher than 15° C., further preferably not higher than 10° C., furthermore preferably not higher than 5° C., and most preferably not higher than 0° C.

The undercoating layer having a rough surface also unites the filter layer to the transparent support. On the rough surface of the undercoating layer, the filter layer is provided. The undercoating layer having a rough surface can be easily formed by applying a polymer latex. The polymer latex has a mean particle size preferably in the At range of 0.02 to 3 μm, and more preferably in the range of 0.05 to 1 μm.

Examples of the polymer compatible with that of the filter layer include acrylic resins, cellulose derivatives, gelatin, casein, starch, polyvinyl alcohol, soluble nylon and polymer latex.

Two or more undercoating layers can be provided on the support.

The undercoating layer can contain other components such as a solvent for swelling the support, a matting agent, a surface active agent, an antistatic agent, a coating aid and a curing agent.

[Filter layer]

The filter layer preferably has a thickness preferably in the range of 0.1 μm to 5 cm.

The filter layer preferably gives an absorption spectrum having the maximum in the wavelength region of 560 nm (green) to 620 nm (red).

The absorption maximum in the wavelength range of 560 to 620 nm is arranged to selectively cut a sub-band, which degrades purity of red fluorescence. The absorption maximum in the wavelength range of 560 to 620 nm can further cut an unnecessary light about 595 nm, which is emitted by excitation of neon gas in PDP. In the optical filter of the present invention, the unnecessary light can be selectively cut without influence on the color of the green fluorescence. The influence on the green fluorescence can be further reduced by obtaining a sharp peak in the absorption spectrum. The absorption maximum in the wavelength range of 560 to 620 nm has a half-width preferably in the range of 10 to 120 nm, more preferably in the range of 15 to 100 nm, further preferably in the range of 20 to 70 nm, and most preferably in the range of 30 to 50 nm.

The filter layer contains a methine dye and a polymer binder.

The methine dye is used in an aggregated form. The methine dye can be classified into a cyanine dye, a merocyanine dye, an arylidene dye, a styryl dye and an oxonol dye. The methine dyes are defined by the following formulas.

Cyanine dye: Bs=Lo—Bo
Merocyanine dye: Bs=Le=Ak
Arylidene dye: Ak=Lo—Ar
Styryl dye: Bo—Le—Ar
Oxonol dye: Ak=Lo—Ae in which Bs is a basic nucleus; Bo is an onium form of a basic nucleus; Ak is an acidic nucleus of a keto type; Ae is an acidic nucleus of an enol type; Ar is an aromatic nucleus; Lo is a methine chain consisting of an odd number of methines; and Le is a methine chain consisting of an even number of methines.

The methine dye preferably is a cyanine dye or an oxonol dye, and more preferably is a cyanine dye.

The cyanine dye is preferably represented by the formula (X).

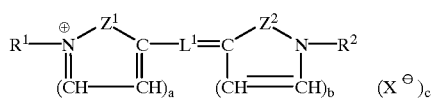

In the formula (X), each of $Z^1$ and $Z^2$ independently is a group of non-metallic atoms forming a five-membered or six-membered nitrogen-containing heterocyclic ring. The nitrogen-containing heterocyclic ring may be condensed with other heterocyclic, aromatic or aliphatic rings. Examples of the nitrogen-containing heterocyclic ring include oxazole ring, isoxazole ring, benzoxazole ring, naphthoxazolering, thiazole ring, benzothiazole ring, naphthothiazole ring, indolenine ring, benzoindolenine ring, imidazole ring, benzimidazole ring, naphthoimidazole ring, quinoline ring, pyridine ring, pyrrolopyridine ring, furopyrrole ring, indolizine ring, imidazoquinoxaline ring and quinoxaline ring. A five-membered nitrogen-containing heterocyclic ring is preferred to a six-membered ring. A five-membered nitrogen-containing heterocyclic ring is preferably condensed with benzene or naphthalene ring. A particularly preferred ring is benzimidazole ring.

The nitrogen-containing heterocyclic ring and the ring condensed therewith can have a substituent group. Examples of the substituent groups include an alkyl group, a cycloalkyl group, an aralkyl group, an alkoxy group, an aryl group, an aryloxy group, a halogen atom (Cl, Br, F), an alkoxycarbonyl group, an alkylthio group, an arylthio group, an acyl group, an acyloxy group, amino, a substituted amino group, an amido group, a sulfonamido group, ureido, a substituted ureido group, carbamoyl, a substituted carbamoyl group, sulfamoyl, a substituted sulfamoyl group, an alkylsulfonyl group, an arylsulfonyl group, hydroxyl, cyano, nitro, sulfo, carboxyl and a heterocyclic group. Each of sulfo and carboxyl can be in the form of a salt.

The alkyl group can have a branched structure. The alkyl group preferably has 1 to 20 carbon atoms. The alkyl group can have a substituent group. Examples of the substituent groups include a halogen atom (Cl, Br, F), an alkoxy group (e.g., methoxy, ethoxy), hydroxyl and cyano. Examples of the alkyl groups (including the substituted alkyl groups) include methyl, ethyl, propyl, t-butyl, hydroxyethyl, methoxyethyl, cyanoethyl and trifluoromethyl.

Examples of the cycloalkyl groups include cyclopentyl and cyclohexyl.

The aralkyl group preferably has 7 to 20 carbon atoms. Examples of the aralkyl groups include benzyl and 2-phenethyl.

The alkoxy group can have a branched structure. The alkoxy group preferably has 1 to 12 carbon atoms. The alkoxy group can have a substituent group. Examples of the substituent groups include an alkoxy group and hydroxyl. Examples of the alkoxy groups (including the substituted alkoxy groups) include methoxy, ethoxy, methoxyethoxy and hydroxyethoxy.

The aryl group preferably is phenyl. The aryl group can have a substituent group. Examples of the substituent groups include an alkyl group, an alkoxy group, a halogen atom and nitro. Examples of the substituted aryl groups include p-tolyl, p-methoxyphenyl, o-chlorophenyl and m-nitrophenyl.

The aryloxy group preferably is phenoxy. The aryloxy group can have a substituent group. Examples of the substituent groups include an alkyl group, an alkoxy group and a halogen atom. Examples of the substituted aryloxy groups include p-chlorophenoxy, p-methylpheoxy and o-methoxyphenoxy.

The alkoxycarbonyl group preferably has 2 to 20 carbon atoms. Examples of the alkoxycarbonyl groups include methoxy carbonyl and ethoxycarbonyl.

The alkylthio group preferably has 1 to 12 carbon atoms. Examples of the alkylthio groups include methylthio, ethylthio and butylthio.

The arylthio group preferably is phenylthio. The arylthio group can have a substituent group. Examples of the substituent group include an alkyl group, an alkoxy group and carboxyl. Examples of the substituted arylthio groups include p-methylphenylthio, p-methoxyphenylthio and o-carboxyphenylthio.

The acyl group preferably has 2 to 20 carbon atoms. Examples of the acyl groups include acetyl and butyryl.

The acyloxy group preferably has 2 to 20 carbon atoms. Examples of the acyloxy groups include acetoxy and butyryloxy.

The substituted amino group preferably has 1 to 20 carbon atoms. Examples of the substituted amino groups include methylamino, anilino and triazinylamino.

The amido group preferably has 2 to 20 carbon atoms. Examples of the amido groups include acetamido, propionamido and isobutanamido.

The sulfonamido group preferably has 1 to 20 carbon atoms. Examples of the sulfonamido groups include methanesulfonamido and benzenesulfonamido.

The substituted ureido group preferably has 2 to 20 carbon atoms. Examples of the substituted ureido groups include 3-methylureido and 3,3-dimethylureido.

The substituted carbamoyl group preferably has 2 to 20 carbon atoms. Examples of the substituted carbamoyl groups include methylcarbamoyl and dimethylcarbamoyl.

The substituted sulfamoyl group preferably has 1 to 20 carbon atoms. Examples of the substituted sulfamoyl groups include dimethylsufamoyl and diethylsulfamoyl.

The alkylsulfonyl group preferably has 1 to 20 carbon atoms. Examples of the alkylsulfonyl groups include methanesulfonyl.

The arylsulfonyl group preferably is benzenesulfonyl.

Examples of the heterocyclic groups include pyridyl and thienyl.

In the formula (X), each of $R^1$ and $R^2$ independently is an alkyl group, an alkenyl group, an aralkyl group or an aryl group. Each of $R^1$ and $R^2$ preferably is an alkyl group The alkyl group can have branched structure. The alkyl group preferably has 1 to 20 carbon atoms and may have a substituent group. Examples of the substituent groups include a halogen atom (Cl, Br, F), an alkoxycarbonyl group (e.g., methoxycarbonyl, ethoxycarbonyl), hydroxyl, sulfo and carboxyl. Each of sulfo and carboxyl may be in the form of a salt.

The alkenyl group preferably has 2 to 10 carbon atoms. Examples of the alkenyl group include 2-pentenyl, vinyl, allyl, 2-butenyl and 1-propenyl. The alkenyl group may have a substituent group. Examples of the substituent groups are the same as those of the alkyl group.

The aralkyl group preferably has 7 to 12 carbon atoms. Examples of the aralkyl group include benzyl and phenethyl. The aralkyl group can have a substituent group. Examples of the substituent groups include an alkyl group (e.g., methyl, ethyl, propyl), an alkoxy group (e.g., methoxy, ethoxy), an aryloxy group (e.g., phenoxy, p-chlorophenoxy), a halogen atom (Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxyphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo, and carboxyl. Each of sulfo and carboxyl may be in the form of a salt.

Examples of the aryl group include phenyl and naphthyl. The aryl group can have a substituent group. Examples of the substituent groups are the same as those of the aralkyl group.

In the formula (X), $L^1$ is a methine chain consisting of an odd number of methines. The number is preferably 1, 3, 5 or 7, and more preferably 3 or 5.

The methine chain can have a substituent group. In the case of that, the substituent is preferably placed at the centered methine (i.e., meso-position) of the chain. Examples of the substituent groups include an alkyl group, an alkoxy group, an aryloxy group, a halogen atom, an alkoxycarbonyl group, a carbon halide group, an alkylthio group, an arylthio group, cyano, nitro, amino, an alkylamino group, an amido group, an acyloxy group, hydroxyl, sulfo and carboxyl. Two substituent groups can be combined with each other to form a five-membered or six-membered ring.

In the formula (X), each of a, b, and c independently is 0 or 1. Each of a and b is preferably 0. In the case where the cyanine dye has an anionic substituent group (e.g., sulfo, carboxyl) to form an inner salt, c is 0.

In the formula (X), X represents an anion. Examples of the anion include a halide ion (e.g., Cl$^-$, Br$^-$, I$^-$), p-toluenesulfonate ion, ethylsulfate ion, PF$_6^-$, BF$_4^-$, and ClO$_4^-$.

The oxonol dye is preferably represented by the formula (XI).

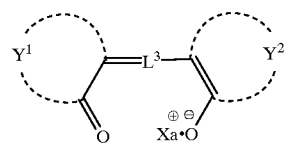

(XI)

In the formula (XI), each of $Y^1$ and $Y^2$ independently is a group of non-metallic atoms forming an aliphatic ring or a heterocyclic ring. The heterocyclic ring is preferred to the aliphatic ring. Examples of the aliphatic rings include indanedione ring. Examples of the heterocyclic rings include 5-pyrazolone ring, oxazolone ring, barbituric acid ring, pyridone ring, rhodanine ring, pyrazolidinedione ring and pyrazolopyridone ring. The aliphatic ring or the heterocyclic ring can have a substituent group. Examples of the substituent groups are the same as those of the substituent groups of the nitrogen-containing heterocyclic group of $Z^1$ or $Z^2$ in the formula (X).

In the formula (XI), $L^3$ is a methine chain consisting of an odd number of methines. The number is preferably 3, 5 or 7 (more preferably 3). The methine chain can have a substituent group. The substituent group is preferably placed at the centered methine (i.e., meso-position) of the chain. Examples of the substituent are the same as those of the substituent groups for the methine chain in the formula (X). Two substituent groups can be combined with each other to form a five-membered or six-membered ring.

In the formula (XI), Xa is proton or a cation. In the case that Xa is proton, the proton and the neighboring oxygen form hydroxyl. Examples of the cations include an alkali metal ion (e.g., Na$^+$, K$^+$), ammonium ion, triethylammonium ion, tributylammonium ion, pyridinium ion, tetrabutylammonium ion and an onium ion.

Examples of the methine dyes are shown below.

(1)–(10)

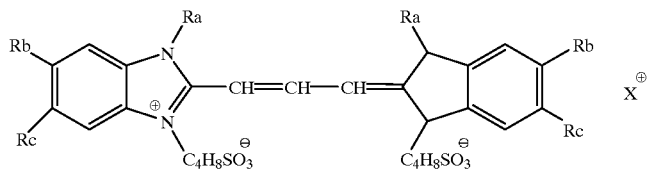

| | Ra: | | Rb: | | Rc: | | X: | |
|---|---|---|---|---|---|---|---|---|
| (1) | Ra: | —CH₃, | Rb: | —Cl, | Rc: | —Cl, | X: | Na |
| (2) | Ra: | —CH₃, | Rb: | —Cl, | Rc: | —CF₃, | X: | K |
| (3) | Ra: | —CH₃, | Rb: | —H, | Rc: | —Cl, | X: | K |
| (4) | Ra: | —CH₃, | Rb: | —H, | Rc: | —CONH₂, | X: | Na |
| (5) | Ra: | —C₂H₅, | Rb: | —Cl, | Rc: | —Cl, | X: | Na |
| (6) | Ra: | —n-C₃H₇, | Rb: | —Cl, | Rc: | —Cl, | X: | Na |
| (7) | Ra: | —C₂H₄OC₂H₅, | Rb: | —Cl, | Rc: | —Cl, | X: | Na |
| (8) | Ra: | —C₂H₄OH, | Rb: | —Cl, | Rc: | —Cl, | X: | Na |
| (9) | Ra: | —CH₂—Ph, | Rb: | —Cl, | Rc: | —Cl, | X: | K |
| (10) | Ra: | —Ph, | Rb: | —Cl, | Rc: | —Cl, | X: | K |

(Remark) Ph: Phenyl (11)–(15)

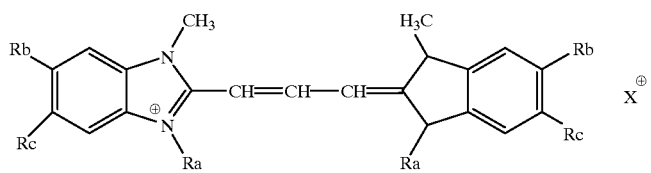

| | Ra: | | Rb: | | Rc: | | X: | |
|---|---|---|---|---|---|---|---|---|
| (11) | Ra: | —C₂H₄SO₃—, | Rb: | —Cl, | Rc: | —Cl, | X: | K |
| (12) | Ra: | —C₃H₆SO₃—, | Rb: | —Cl, | Rc: | —CF₃—, | X: | Na |
| (13) | Ra: | —CH₂CH₂CH(CH₃)SO₃—, | Rb: | —H, | Rc: | —CN, | X: | Na |
| (14) | Ra: | —C₂H₄SO₃—, | Rb: | —H, | Rc: | —CN, | X: | (C₂H₅)₃HN |
| (15) | Ra: | —C₄H₈SO₃—, | Rb: | —H, | Rc: | —CN, | X: | K |

(16)

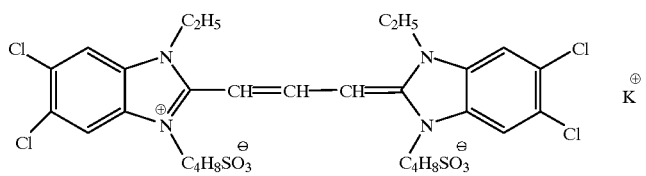

(17)

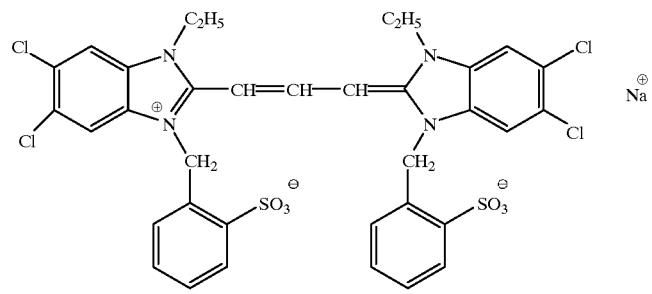

(18)

-continued

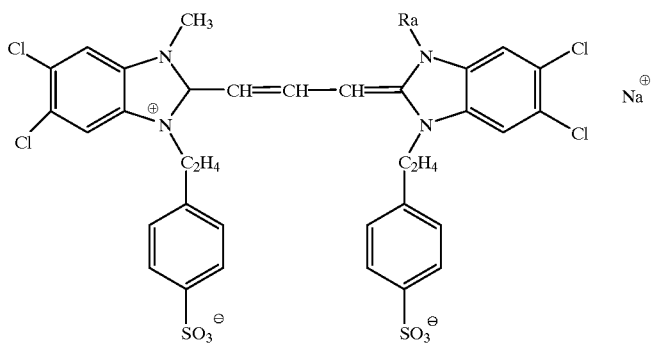

(19)–(29)

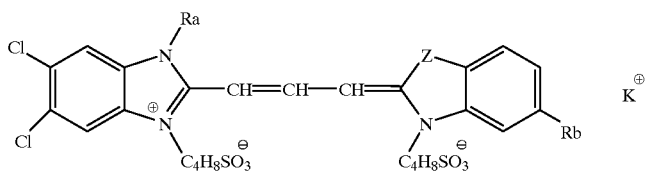

| | Ra: | | Rb: | | Z: | |
|---|---|---|---|---|---|---|
| (19) | Ra: | —CH₃, | Rb: | —Ph, | Z: | —S— |
| (20) | Ra: | —C₂H₅, | Rb: | —Ph, | Z: | —S— |
| (21) | Ra: | —C₂H₄OCH₃, | Rb: | —Ph, | Z: | —S— |
| (22) | Ra: | —Ph, | Rb: | —Ph, | Z: | —S— |
| (23) | Ra: | —CH₂—Ph, | Rb: | —Ph, | Z: | —S— |
| (24) | Ra: | —CH₃, | Rb: | —Cl, | Z: | —S— |
| (25) | Ra: | —CH₃, | Rb: | —Cl, | Z: | —O— |
| (26) | Ra: | —C₂H₅, | Rb: | —Ph, | Z: | —O— |
| (27) | Ra: | —C₂H₅, | Rb: | —Cl, | Z: | —Se— |
| (28) | Ra: | —C₂H₅, | Rb: | —Cl, | Z: | —C(CH₃)₂— |
| (29) | Ra: | —CH₃, | Rb: | —Ph, | Z: | —Se— |

(Remark) Ph: Phenyl (30)–(33)

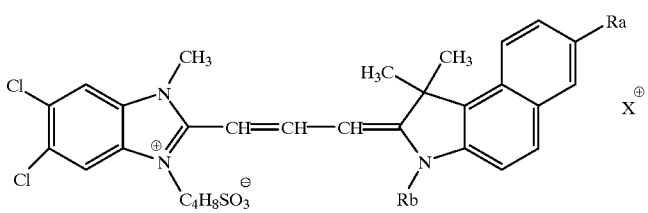

| | Ra: | | Rb: | | X: | |
|---|---|---|---|---|---|---|
| (30) | Ra: | —H, | Rb: | —C₃H₆SO₃—, | X: | (C₂H₅)₃HN |
| (31) | Ra: | —SO₃—, | Rb: | —C₃H₆SO₃—, | X: | 2K |
| (32) | Ra: | —SO₃—, | Rb: | —C₃H₆SO₃—, | X: | 2Na |
| (33) | Ra: | —SO₃—, | Rb: | —CH₂CH₂CH(CH₃)SO₃—, | X: | 2K |

(34)–(41)

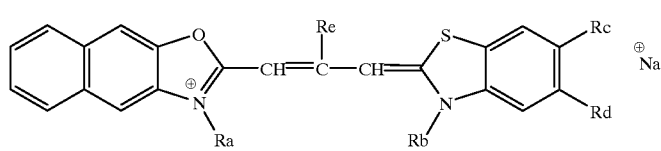

| | Ra: | Rb: | Rc: | Rd: | Re: |
|---|---|---|---|---|---|
| (34) | —C₃H₆SO₃—, | —C₃H₆SO₃—, | —H, | —Cl, | —C₂H₅ |
| (35) | —C₄H₈SO₃—, | —C₄H₈SO₃—, | —H, | —Cl, | —C₂H₅ |
| (36) | —C₂H₄SO₃—, | —C₄H₈SO₃—, | —Cl, | —Cl, | —C₂H₅ |
| (37) | —C₂H₄SO₃—, | —C₂H₄SO₃—, | —CH₃, | —CH₃, | —C₂H₅ |
| (38) | —C₄H₈SO₃—, | —C₄H₈SO₃—, | —CH₃, | —CH₃, | —C₂H₅ |
| (39) | —C₄H₈SO₃—, | —C₃H₆SO₃—, | —H, | —Ph, | —C₂H₅ |
| (40) | —C₄H₈SO₃—, | —C₄H₈SO₃—, | —H, | —OCH₃, | —CH₃ |
| (41) | —C₄H₈SO₃—, | —C₄H₈SO₃—, | —H, | —Cl, | —CH₃ |

(Remark) Ph: Phenyl (42)–(44)

-continued
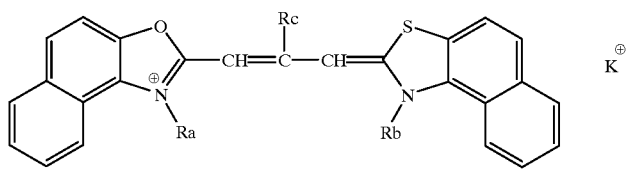
| | Ra: | | Rb: | | Rc: | |
|---|---|---|---|---|---|---|
| (42) | Ra: | —C₃H₆SO₃—, | Rb: | —C₃H₆SO₃—, | Rc: | —H |
| (43) | Ra: | —C₃H₆SO₃—, | Rb: | —C₃H₆SO₃—, | Rc: | —CH₃ |
| (44) | Ra: | —C₄H₈SO₃—, | Rb: | —C₄H₈SO₃—, | Rc: | —C₂H₅ |
(45)–(47)
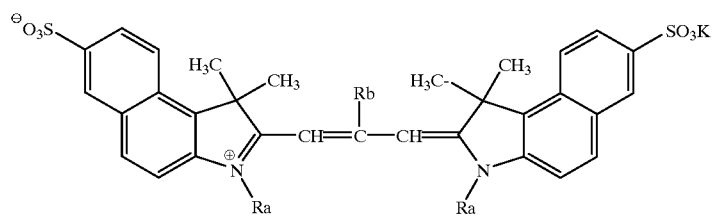
| (45) | Ra: | —C₄H₈SO₃—, | Rb: | —H |
| (46) | Ra: | —C₄H₈SO₃—, | Rb: | —CH₃ |
| (47) | Ra: | —C₃H₆SO₃—, | Rb: | —H |
(48)–(50)
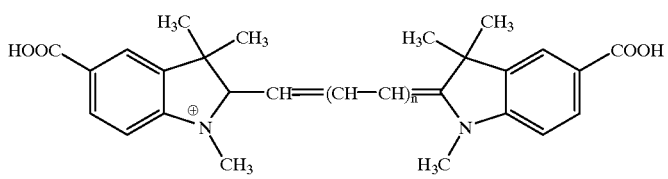
| (48) | n: | 1 |
| (49) | n: | 2 |
| (50) | n: | 3 |
(51)
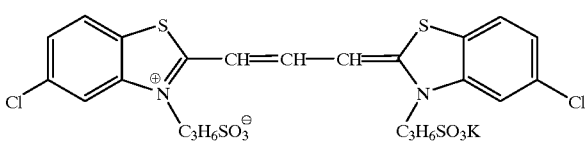
(52)
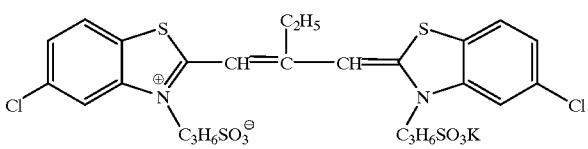
(53)
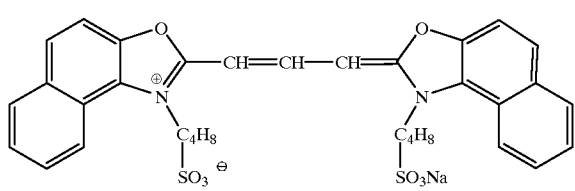
(54)

-continued
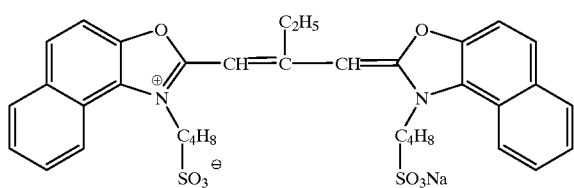
(55)
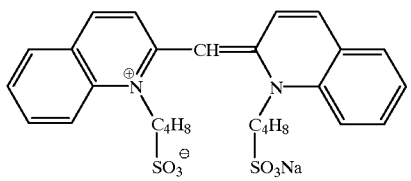
(56)
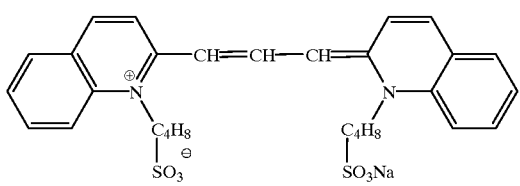
(57)
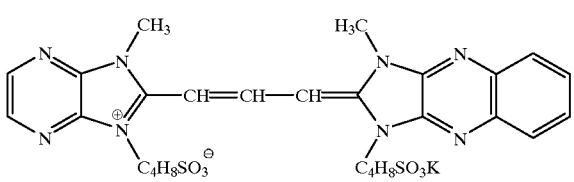
(58)
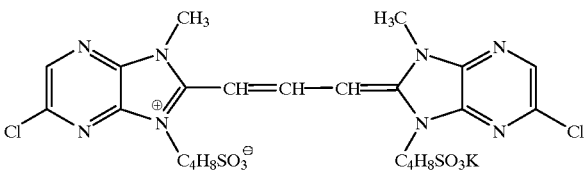
(59)
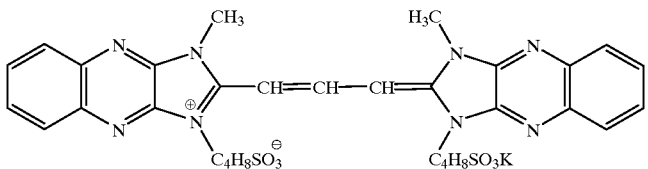
(60)–(63)
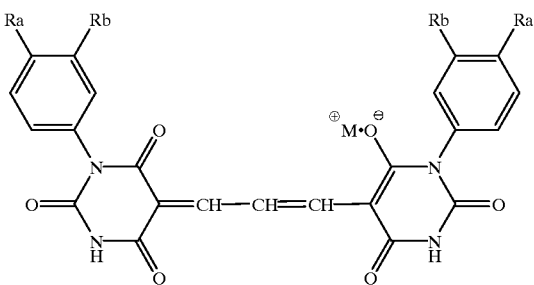
(60)　Ra:　—H,　Rb:　—H,　M:　H -continued

| (61) | Ra: | —H,  | Rb: | —H,  | M: | $(C_2H_5)_3HN$ |
| (62) | Ra: | —OH, | Rb: | —H,  | M: | $(C_2H_5)_3HN$ |
| (63) | Ra: | —H,  | Rb: | —OH, | M: | $(C_2H_5)_3HN$ |

(64)

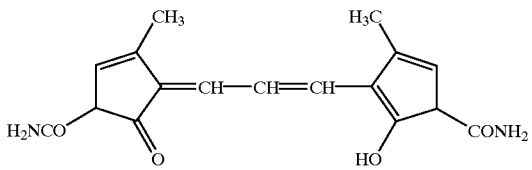

(65)

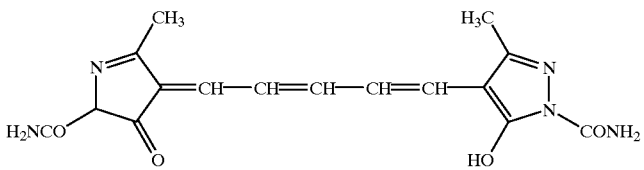

The methine dyes can be synthesized by referring to the descriptions of F. M. Harmer, Heterocyclic Compounds Cyanine Dyes and Related Compounds, John Wiley and Sons, New York, London, 1964 and Japanese Patent Provisional Publication No. 6(1994)-313939.

In the present invention, the methine dye is used in an aggregated form.

A methine dye in an aggregated form usually has a J-band and a sharp absorption peak in its spectrum. The aggregated form of the dye and the J-band are described in Photographic Science and Engineering Vol. 18, No. 323–335 (1974). The absorption maximum of a methine dye can be shifted to a long wavelength region by changing the non-aggregated form to the aggregated form. Therefore, it can be determined by measuring an absorption maximum whether a dye contained in a filter layer is in an aggregated form or not.

In the present specification, the aggregated form means that the wavelength of the absorption maximum of the aggregated form is longer than the wavelength of the absorption maximum of the same dye in a solution, and the difference between the absorption maximums is larger than 40 nm. The difference between the absorption maximums is preferably larger than 45 nm, more preferably larger than 50 nm, and most preferably larger than 60 nm.

The transmittance at the absorption maximum in the wavelength range of 560 to 620 nm is preferably in the range of 0.01 to 80%.

Some methine dyes can be prepared as an aggregated form merely by dissolving the dyes in water. The aggregated form is usually obtained by adding gelatin or salt (e.g., barium chloride, ammonium chloride, sodium chloride) to an aqueous solution of a dye. The aggregated form is preferably obtained by adding gelatin to an aqueous solution of a dye.

The aggregated form can also be obtained as a solid fine particle dispersion. The fine particles can be prepared by means of known mills. Examples of the mill include a ball mill, a vibrating mill, a planetary ball mill, a sand mill, a colloid mill, a jet mill and a roller mill. A vertical or horizontal dispersing machine (described in Japanese Patent Provisional Publication No. 52(1977)-92716 and International Patent No. 88/074794) is preferred.

The dispersing process can be carried out in the presence of an appropriate medium (e.g., water, alcohol). In that case, it is preferred to use a dispersing surface active agent. As the surface active agent, an anionic surface active agent (described in Japanese Patent Provisional Publication No. 52(1977)-92716 and International Patent No. 88/074794) is preferably used. If necessary, an anionic polymer or a nonionic or cationic surface active agent may be used.

The powdery fine particles of the dye can be prepared by the steps of dissolving the dye in an appropriate solvent and adding a bad solvent to precipitate the particles. In that case, the aforementioned surface active agents are also employable. The fine particles can also be precipitated by adjusting the pH value. The obtained fine particles are also in the aggregated form.

The filter layer contains the methine dye preferably in an amount of 0.01 mg per $m^2$ to 10 g per $m^2$, and more preferably in an amount of 1 mg per $m^2$ to 1 g per $m^2$.

Two or more dyes in the aggregated from can be used in combination. The methine dye in the aggregated from can be used in combination with another dye.

The filter layer preferably has the absorption maximum in the wavelength range of 500 to 550 nm (green) as well as the above-described absorption maximum in the wavelength range of 560 to 620 nm (green to red). In the case that the methine dye in the aggregated from can be used in combination with another dye, the methine dye in the aggregated form preferably has the absorption maximum in the wavelength range of 560 to 620 nm and another dye preferably has the absorption maximum in the wavelength range of 500 to 550 nm. Another dye is preferably in a non-aggregated from. In the present specification, the non-aggregated form means that the difference in the wavelength between the absorption maximum of the aggregated form and the absorption maximum of the same dye in a solution is not larger than 40 nm.

The transmittance at the absorption maximum in the wavelength range of 500 to 550 nm is preferably in the range of 30 to 85%. The transmittance at the absorption maximum in the wavelength range of 500 to 550 nm is preferably larger than the transmittance at the absorption maximum in the wavelength range of 560 to 620 nm. Further, the half-width of the absorption maximum in the wavelength range of 500 to 550 nm is preferably larger than the half-width of the absorption maximum in the wavelength range of 560 to 620 nm.

A squarylium dye, a triphenylmethane dye, an arylidene dye, an oxonol dye, an azo dye, an azomethine dye, an anthraquinone dye, a cyanine dye, a merocyanine dye or xanthene dye can be used as a dye having an absorption maximum in the wavelength range of 500 to 550 nm. The dyes are described in U.S. Pat. Nos. 2,274,782, 3,471,293, 3,379,533. The filter layer can contain a pigment having an absorption maximum in the wavelength range of 500 to 550 nm in place of the dye.

The filter layer can further contain a dye having the an absorption maximum in the other wavelength range (other than 500 to 550 nm and 560 to 620 nm). For example, the filter layer can contain a near infrared absorbing dye. Examples of the near infrared absorbing dyes include a cyanine dye (described in Japanese Patent Provisional Publication No. 9(1997)-96891), a metal chelate dye, an aminium dye, a diimmonium dye, a quinone dye, a squarylium dye (described in Japanese Patent Provisional Publication Nos. 9(1997)-90547, 10(1998)-204310) and various methine dyes. The near infrared absorbing dyes are also described in Dyes (written in Japanese), 61[4]215–226 (1988) and Chemical Industries (written in Japanese, May, 1986).

The filter layer preferably contains two or more dyes in combination to obtain the absorption maximums in the ultraviolet region (400 nm or less), the visible region (500 to 620 nm) and the near infrared region (700 nm or more). Where the filter layer contains two or more dyes as is described above, the optical filter can have two or more functions of improving reproducibility of an image, improving stability to light, preventing the display device from coloring when the image is not displayed, and preventing malfunction of a remote controller using a near infrared ray.

The filter layer contains a binder polymer. Examples of the polymer include natural polymers (e.g., gelatin, cellulose derivatives, alginic acid), and synthesized polymers (e.g., polymethyl methacrylate, polyvinyl butyral, polyvinyl pyrrolidone, polyvinyl alcohol, polyvinyl chloride, styrene-butadiene copolymer, polystyrene, polycarbonate, water-soluble polyimide). Hydrophilic polymers (e.g., the above-mentioned natural polymers, polyvinyl butyral, polyvinyl pyrrolidone, polyvinyl alcohol, water-soluble polyimide) are preferred, and gelatin is particularly preferred.

The filter layer may contain an anti-fading agent, which stabilizes the dye. Examples of the anti-fading agent include hydroquinone derivatives (described in U.S. Pat. Nos. 3,935,016 and 3,982,944), hydroquinone diether derivatives (described in U.S. Pat. No. 4,254,216 and Japanese Patent Provisional Publication No. 55(1980)-21004), phenol derivatives (described in Japanese Patent Provisional Publication No. 54(1979)-145530), spiroindane or methylenedioxybenzene derivatives (described in British Patent Publication Nos. 2,077,455, 2,062,888 and Japanese Patent Provisional Publication No. 61(1986)-90155), chroman, spirochroman or coumaran derivatives (described in U.S. Pat. Nos. 3,432,300, 3,573,050, 3,574,627, 3,764,337 and Japanese Patent Provisional Publication Nos. 52(1977)-152225, 53(1978)-20327, 53(1978)-17729, and 61(1986)-90156), hydroquinone monoether or p-aminophenol derivatives (described in British Patent Publication Nos. 1,347,556, 2,066,975, Japanese Patent Publication No. 54(1979)-12337, and Japanese Patent Provisional Publication No. 55(1980)-6321), and bisphenol derivatives (described in U.S. Pat. No. 3,700,455, and Japanese Patent Publication No. 48(1973)-31625).

As the anti-fading agent, metal complexes (described in U.S. Pat. No. 4,245,018 and Japanese Patent Provisional Publication No. 60(1985)-97353) can be used to improve the stability of the dye against light or heat. Further, a singlet oxygen quencher is also usable as the anti-fading agent for improving the light resistance of the dye. Examples of the singlet oxygen quencher include nitroso compounds (described in Japanese Patent Provisional Publication No. 2(1990)-300288), diimmonium compounds (described in U.S. Pat. No. 465,612), nickel complexes (described in Japanese Patent Provisional Publication No. 4(1992)-146189) and anti-oxidizing agents (described in European Patent Publication No. 820057A).

[Anti-reflection layers]

The optical filter can have an anti-reflection layer. The optical filter having the anti-reflection layer serves as an anti-reflection film. As the anti-reflection layer, a low refractive index layer is essential. The refractive index of the low refractive index layer is lower than that of the support, and is preferably in the range of 1.20 to 1.55 (more preferably, 1.30 to 1.55).

The low refractive index layer has a thickness preferably of 50 to 400 nm, and more preferably of 50 to 200 nm.

Various kinds of low refractive index layer have been proposed, and are employable for the invention. Examples of them include a layer comprising fluorine-contained polymer of low refractive index (disclosed in Japanese Patent Provisional Publication Nos. 57(1982)-34526, 3(1991)-130103, 6(1994)-115023, 8(1996)-313702, and 7(1995)-168004), a layer formed by sol-gel method (disclosed in Japanese Patent Provisional Publication Nos. 5(1993)-208811, 6(1994)-299091, and 7(1995)-168003), and a layer containing fine particles (disclosed in Japanese Patent Publication No. 60(1985)-59250, and Japanese Patent Provisional Publication Nos. 5(1993)-13021, 6(1994)-56478, 7(1995)-92306, and 9(1997)-288201). The low refractive index layer containing fine particles may further contain micro voids among the particles. The void ratio in that layer is preferably in the range of 3 to 50 vol. %, and more preferably 5 to 35 vol. %.

Besides the low refractive index layer, layers having higher refractive indexes (i.e., middle and high refractive index layers) are preferably provided to reduce the reflection in a wide wavelength region.

The high refractive index layer has a refractive index preferably in the range of 1.65 to 2.40, and more preferably in the range of 1.70 to 2.20. The middle refractive index layer has a refractive index between those of the low and high refractive index layers. The refractive index is preferably in the range of 1.50 to 1.90, and more preferably in the range of 1.55 to 1.70.

Each of the middle and high refractive index layers has a thickness preferably in the range of 5 nm to 100 μm, more preferably in the range of 10 nm to 10 μm, and most preferably in the range of 30 nm to 1 μm. The haze of each layer is preferably in the range of not more than 5%, more preferably not more than 3%, further preferably not more than 1%.

The middle and high refractive index layers can be formed from a binder polymer having a relatively high refractive index. Examples of that binder polymer include polystyrene, styrene copolymer, polycarbonate, melamine resin, phenol resin, epoxy resin, and a polyurethane derived from the reaction between cyclic (alicyclic or aromatic) isocyanate and polyol. Further, other polymers having cyclic (aromatic, heterocyclic or alicyclic) groups and polymers substituted with a halogen atom except fluorine also have high refractive indexes. The polymer may be prepared by polymerization of monomers having double bonds for radical hardening.

For a higher refractive index, inorganic fine particles may be dispersed in the binder polymers. The inorganic fine particles preferably have a refractive index of 1.80 to 2.80. As the materials for the particles, metal oxides and sulfides are preferred. Examples of them include titanium dioxide (rutile, mixed crystal of rutile/anatase, anatase, amorphous structure), tin oxide, indium oxide, zinc oxide, zirconium oxide, and zinc sulfide. Preferred materials are titanium oxide, tin oxide, and zirconium oxide. The inorganic fine particles may contain other elements, as well as those oxides or sulfides of main component. The "main component" here means the component contained in the largest content (wt. %). Examples of the other elements include Ti, Zr, Sn, Sb, Cu, Fe, Mn, Pb, Cd, As, Cr, Hg, Zn, Al, Mg, Si, P, and S.

The middle and high refractive index layers may be formed from liquid or soluble film-formable inorganic materials. Examples of the materials include alkoxides of various elements, salts of organic acids, coordination compounds (e.g., chelate compounds), and active inorganic polymers.

The surface of the anti-reflection layer (i.e., the low refractive index layer) can be made to show anti-glare performance (which prevents the surface from reflecting the surrounding scene by scattering the incident light). For example, the anti-reflection layer may be formed on a finely roughened surface of a transparent film. Otherwise, the surface of the anti-reflection layer may be roughened by means of an embossing roll. The haze of the anti-reflection layer having such surface is generally in the range of 3 to 30%.

[Electromagnetic wave shielding layer]

A layer having an effect of shielding an electromagnetic wave has a surface resistance preferably in the range of 0.1 to 500 $\Omega/m^2$, and more preferably in the range of 0.1 to 10 $\Omega/m^2$. The layer is preferably transparent because the layer is provided on an optical filter. The electromagnetic wave shielding layer preferably is a layer known as a transparent electroconductive layer.

The transparent electroconductive layer preferably is a metallic thin film or a metal oxide thin film. The metal for the metallic film preferably is a noble metal, more preferably is gold, silver, palladium or alloy thereof, and most preferably is an alloy of gold with silver. The content of silver in the alloy is preferably more than 60 wt. %. The metal oxide preferably is $SnO_2$, ZnO, ITO or $In_2O_3$.

The metallic thin film can be laminated with the metal oxide thin film. In the lamination, the metal oxide film can protect metallic film from oxidation, and the transparency of visible light can be increased. The metal oxide laminated with the metallic film preferably is divalent, trivalent or tetravalent metal oxide (e.g., zirconium oxide, titanium oxide, magnesium oxide, silicon oxide, aluminum oxide). A metal alkoxide thin film can also be laminated with the metallic thin film. The metal oxide film or the metal alkoxide film can be laminated with each side of the metallic thin film. Different films can be laminated with both sides of the metallic film.

The metal film has a thickness preferably in the range of 4 to 40 nm, more preferably in the range of 5 to 35 nm, and most preferably in the range of 6 to 30 nm.

The metal oxide film or the metal alkoxide film has a thickness preferably in the range of 20 to 300 nm, and more preferably in the range of 40 to 100 nm.

The electromagnetic wave shielding layer can be formed according to a spattering method, a vacuum evaporating method, an ion plating method, a plasma CVD method, a plasma PVD method or a superfine particle (of metal or metal oxide) coating method.

[Infrared ray shielding layer]

The infrared ray shielding layer preferably has a function of shielding a near infrared ray of 800 to 1,200 nm. The infrared ray shielding layer can be formed of a resin mixture, which contains an infrared ray shielding component. Examples of the infrared ray shielding components include copper (described in Japanese Patent Provisional Publication No. 6(1994)-118228), a copper compound or a phosphor compound (described in Japanese Patent Provisional Publication No. 62(1987)-5190), a copper compound or a thiourea compound (described in Japanese Patent Provisional Publication No. 6(1994)-73197) and tungsten compound (described in U.S. Pat. No. 3,647,772). The resin mixture can be added to the transparent support in place of forming the infrared ray shielding layer.

The thin silver layer described as the electromagnetic wave shielding layer can also function as the infrared ray shielding layer.

[Other layers]

The optical filter can further comprise a hard coating layer, a slippery layer, a contamination preventive layer, an antistatic layer or an intermediate layer.

The hard coating layer preferably contains a cross-linked polymer, and can be formed from acrylic, urethane or epoxy polymer or oligomer (e.g., ultraviolet curable resin) or silica material.

On the top surface of the optical filter, a slippery layer may be provided. The slippery layer gives slipperiness to the surface of the optical filter, and improves the scratch resistance of the filter. The slippery layer can be formed from polyorganosiloxane (e.g., silicone oil), a natural wax, a petroleum wax, a metal salt of higher fatty acid, a fluorine lubricant or its derivative. The thickness of the slippery layer is preferably in the range of 2 to 20 nm.

The contamination preventive layer can be made of a fluorine containing polymer. The thickness of the contamination preventive layer is preferably in the range of 2 to 100 nm, and more preferably in the range of 5 to 30 nm.

The layers such as the anti-reflection layers (middle, high, and low refractive index layers), the filter layer, the undercoating layer, the hard coating layer, the slippery layer, and other layers can be formed by known coating methods. Examples of the coating method include dip coating, air knife coating, curtain coating, roller coating, wire bar coating, gravure coating, and extrusion coating with a hopper (described in U.S. Pat. No. 2,681,294). Two or more layers may be simultaneously formed by coating. The method for simultaneous coating is described in U.S. Pat. Nos. 2,761,791, 2,941,898, 3,508,947, and 3,526,528; and "Coating Engineering" pp.253, written by Y. Harazaki, published by Asakura Shoten (1973).

[Use of optical filter]

The optical filter of the invention can be applied on a display device such as a liquid crystal display (LCD), a plasma display panel (PDP), an electroluminescence display (ELD) or a cathode ray tube display (CRT). In the case that the optical filter has an anti-reflection layer, the optical filter is so arranged on the device that the surface opposite to the low refractive index layer is attached to the display surface. The optical filter of the invention is particularly effective in a plasma display panel (PDP).

A plasma display panel (PDP) comprises gas, glass substrates (front and back glass substrates), electrodes, electrode-lead member, thick film printing member, and phosphor. Each of the glass substrates is equipped with the electrode and an insulating layer. On the back glass substrate, a phosphor layer is further provided. The gas is enclosed between the substrates.

A plasma display panel (PDP) is commercially available, and is described in Japanese Patent Provisional Publication Nos. 5(1993)-205643 and 9(1997)-306366.

In the display device such as the plasma display panel, the display surface is covered with the optical filter. The optical filter can be directly attached on the display surface. In the case that a plate is arranged in front of the display surface, the optical filter can be attached to the front (outside) surface of the front plate or the back (display side) surface of the plate.

EXAMPLE 1

Formation of Undercoating Layer

Both surfaces of a polyethylene terephthalate film (thickness: 175 μm) were subjected to a corona discharge treatment, and a latex of styrene-butadiene copolymer was applied on one of the surfaces to form an undercoating layer (thickness: 140 nm).

Formation of Second Undercoating Layer

On the undercoating layer, an aqueous gelatin solution containing acetic acid and glutaric aldehyde was applied to form a second undercoating layer (thickness: 50 nm).

Formation of Low Refractive Index Layer

To 2.50 g of a reactive fluorocarbon polymer (JN-7219, JSR Co., Ltd.), 1.3 g of t-butanol was added. The mixture was stirred at room temperature for 10 minutes, and filtered through a polypropylene filter (porosity size: 1 μm) to prepare a coating solution for a low refractive index layer. The solution was applied on the support surface opposite to the undercoating layers by using a bar coater, to form a layer (dry thickness: 110 nm). The layer was dried and hardened at 120° C. for 30 minutes to form a low refractive index layer.

Formation of Ultraviolet Absorbing Layer

With 10 g of the ultraviolet absorbing agent (I-6), 17 ml of a mixture of the following high boiling point organic solvents (weight ratio of (1):(2) was 2:1) and 9 ml of ethyl acetate was mixed. The mixture was heated at 50° C. to dissolve the ultraviolet absorbing agent in the solvents. The solution was added to 50 g of 20 wt. % aqueous gelatin solution containing 6 ml of 10 wt. % aqueous solution of sodium dodecylbenzenesulfonate. The mixture was stirred at 5,000 rpm for 20 minutes. Water was added to the mixture to obtain 170 g of an emulsion.

High boiling point organic solvent (1)

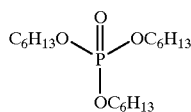

High boiling point organic solvent (2)

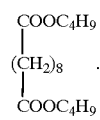

The emulsion was coated on the second undercoating layer to form an ultraviolet absorbing layer (dry thickness: 3.5 μm).

Formation of Filter Layer

To 180 g of 10 wt. % aqueous gelatin solution, 0.05 g of the methine dye (1) in an aggregated form and 0.15 g of the following dye (A) in a non-aggregated form were added. The mixture was filtered through a polypropylene filter (porosity size: 2 μm) to prepare a coating solution for a filter layer.

Dye (A)

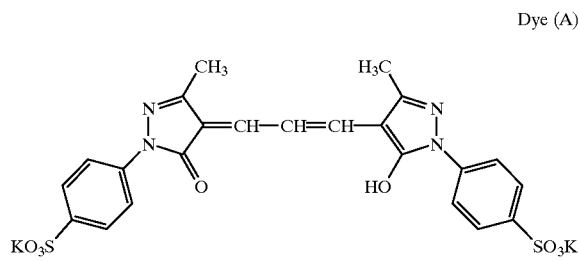

The coating solution for the filter layer was coated on the ultraviolet absorbing layer, and dried at 120° C. for 10 minutes to form a filter layer (dry thickness: 3.5 μm). Thus, an optical filter was prepared.

The absorption spectrum of the obtained optical filter was measured. The filter layer has two absorption maximums at 533 nm and 594 nm. The transmittance at 533 nm was 65%, and the transmittance at 594 nm was 30%. The half-width of the absorption maximum at 533 nm was 65 nm, and the half-width of the absorption maximum at 594 nm was 35 nm.

EXAMPLE 2

The procedure of Example 1 was repeated except that 9.0 g of the ultraviolet absorbing agent (I-3) and 1.0 g of the ultraviolet absorbing agent (I-11) were used in place of 10 g of the ultraviolet absorbing agent (I-6).

EXAMPLE 3

The procedure of Example 1 was repeated except that 4.5 g of the ultraviolet absorbing agent (I-17), 4.5 g of the ultraviolet absorbing agent (I-2) and 1.0 g of the ultraviolet absorbing agent (I-9) were used in place of 10 g of the ultraviolet absorbing agent (I-6).

EXAMPLE 4

The procedure of Example 1 was repeated except that 10 g of the ultraviolet absorbing agent (I-2) was used in place of 10 g of the ultraviolet absorbing agent (I-6).

EXAMPLE 5

The procedure of Example 1 was repeated except that 8.3 g of the ultraviolet absorbing agent (II-1) and 1.7 g of the ultraviolet absorbing agent (II-11) were used in place of 10 g of the ultraviolet absorbing agent (I-6).

EXAMPLE 6

The procedure of Example 1 was repeated except that 10 g of the ultraviolet absorbing agent (III-33) was used in place of 10 g of the ultraviolet absorbing agent (I-6).

EXAMPLE 7

The procedure of Example 1 was repeated except that 9.0 g of the ultraviolet absorbing agent (III-46) and 1.0 g of the ultraviolet absorbing agent (III-38) were used in place of 10 g of the ultraviolet absorbing agent (I-6).

EXAMPLE 8

The procedure of Example 1 was repeated except that 10 g of the ultraviolet absorbing agent (III-5) was used in place of 10 g of the ultraviolet absorbing agent (I-6).

COMPARISON EXAMPLE 1

The procedure of Example 1 was repeated except that the methine dye (1) was not used.

COMPARISON EXAMPLE 2

The procedure of Example 1 was repeated except that the ultraviolet absorbing layer was not formed.

Evaluation of Optical Filters

Each of the optical filters was attached to the front plate of a commercially available plasma display panel (PDS4202J-H, Fujitsu Limited) by an adhesive in such a manner that the filter layer faces the front plate.

The contract of the displayed image was measured. Further, white light and red light were evaluated.

The optical filter was irradiated with light (from the side opposite to the filter layer) by using a xenon lump (from which a UV filter had been removed) at 100,000 lx for 100 hours. The remaining ratio of the dye was measured at 594 nm and at 530 nm (absorption maximums of the dyes). The remaining ratio (light resistance) was defined by the following formula.

Remaining ratio=100×(100−transmittance after light irradiation)/(100−transmittance before light irradiation) The results are set forth in Table 1.

TABLE 1

| Ex. | Ultraviolet absorbing agent (amount) | Dye A | Dye N | Contrast | Color W | Color R | Resist. 594 | Resist. 530 |
|---|---|---|---|---|---|---|---|---|
| 1 | I-6 (10.0) | (1) | (A) | 15:1 | A | A | 90% | 91% |
| 2 | I-3 (9.0) + I-11 (1.0) | (1) | (A) | 15:1 | A | A | 89% | 91% |
| 3 | I-17 (4.5) + I-2 (4.5) + I-9 (1.0) | (1) | (A) | 15:1 | A | A | 89% | 90% |
| 4 | II-2 (10.0) | (1) | (A) | 15:1 | A | A | 91% | 92% |
| 5 | II-1 (8.3) + II-11 (1.7) | (1) | (A) | 15:1 | A | A | 90% | 92% |
| 6 | III-33 (10.0) | (1) | (A) | 15:1 | A | A | 90% | 91% |
| 7 | III-46 (9.0) + III-38 (1.0) | (1) | (A) | 15:1 | A | A | 88% | 90% |
| 8 | III-5 (10.0) | (1) | (A) | 15:1 | A | A | 92% | 93% |
| C1 | I-6 (10.0) | — | (A) | 13:1 | A | B | — | 91% |
| C2 | None | (1) | (A) | 15:1 | A | A | 68% | 75% |

(Remark)
Ex. C1: Comparison Example 1
Ex. C2: Comparison Example 2
Dye A: A methine dye in an aggregated form
Dye N: A dye in a non-aggregated form
Color W: White color of displayed light
Color R: Red color of displayed light
Color (A): Reproduced
Color (B): Not reproduced
Resist.: Light resistance measured at 594 nm and at 530 nm

EXAMPLE 9

Preparation of Transparent Support

With 45 weight parts of cellulose acetate (average acetic acid content: 60.9%), 1.50 weight part of the ultraviolet absorbing agent (I-14), 2.75 weight parts of triphenyl phosphate (plasticizer), 2.20 weight parts of biphenyldiphenyl phosphate (plasticizer), 232.72 weight parts of methylene chloride, 42.57 weight parts of methanol and 8.50 weight parts of n-butanol were mixed to prepare a solution (dope).

The dope was coated on a band casting machine (effective length: 6 m), and dried to prepare a transparent support (dry thickness: 100 µm).

Formation of Undercoating Layer

On one surface of the transparent support, a dispersion of gelatin in methanol and acetone was coated, and dried to form an undercoating layer (thickness: 200 nm).

Formation of Hard Coating Layer

In 50 weight parts of methyl ethyl ketone, 25 weight parts of dipentaerythrytol hexaacrylate (DPHA, Nippon Kayaku Co., Ltd.), 25 weight parts of urethane acrylate oligomer (UV-6300B, Nippon Synthetic Chemical Industry Co., Ltd.), 2 weight parts of a photopolymerization initiator (Irgacure 907, Ciba-Geigy) and 0.5 weight part of a photosensitizer (Kayacure DETX, Nippon Kayaku Co., Ltd.) were dissolved to prepare a coating solution for a hard coating layer. The coating solution was applied on the support surface opposite to the undercoating layer by using a wired bar coater. The formed layer was dried, and irradiated with ultraviolet ray to form a hard coating layer (thickness: 6 µm).

Formation of Filter Layer

To 180 g of 10 wt. % aqueous gelatin solution, 0.05 g of the methine dye (5) in an aggregated form and 0.15 g of the following dye (B) in a non-aggregated form were added. The mixture was filtered through a polypropylene filter (porosity size: 2 µm) to prepare a coating solution for a filter layer.

Dye (B)

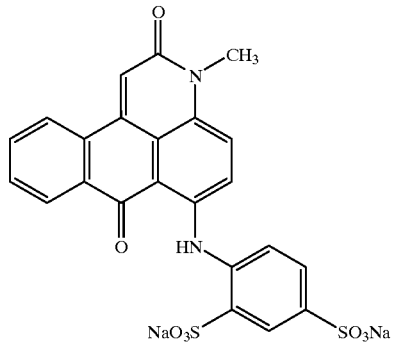

The coating solution for the filter layer was coated on the undercoating layer, and dried at 120° C. for 10 minutes to form a filter layer (dry thickness: 3.5 µm). Thus, an optical filter was prepared.

The absorption spectrum of the obtained optical filter was measured. The filter layer has two absorption maximums at 532 nm and 591 nm. The transmittance at 532 nm was 75%, and the transmittance at 591 nm was 21%. The half-width of the absorption maximum at 532 nm was 82 nm, and the half-width of the absorption maximum at 591 nm was 24 nm.

EXAMPLE 10

The procedure of Example 9 was repeated except that 1.50 weight part of the ultraviolet absorbing agent (I-15) was used in place of 1.50 weight part of the ultraviolet absorbing agent (I-14).

EXAMPLE 11

The procedure of Example 9 was repeated except that 1.20 weight part of the ultraviolet absorbing agent (I-6) and 0.30 weight part of the ultraviolet absorbing agent (I-13) were used in place of 1.50 weight part of the ultraviolet absorbing agent (I-14).

EXAMPLE 12

The procedure of Example 9 was repeated except that 1.50 weight part of the ultraviolet absorbing agent (II-9) was used in place of 1.50 weight part of the ultraviolet absorbing agent (I-14).

EXAMPLE 13

The procedure of Example 9 was repeated except that 0.75 weight part of the ultraviolet absorbing agent (II-3) and 0.75 weight part of the ultraviolet absorbing agent (II-18) were used in place of 1.50 weight part of the ultraviolet absorbing agent (I-14).

EXAMPLE 14

The procedure of Example 9 was repeated except that 1.50 weight part of the ultraviolet absorbing agent (III-22) was used in place of 1.50 weight part of the ultraviolet absorbing agent (I-14).

EXAMPLE 15

The procedure of Example 9 was repeated except that 1.50 weight part of the ultraviolet absorbing agent (III-5) was used in place of 1.50 weight part of the ultraviolet absorbing agent (I-14).

EXAMPLE 8

The procedure of Example 9 was repeated except that 1.00 weight part of the ultraviolet absorbing agent (III-35) and 0.50 weight part of the ultraviolet absorbing agent (III-41) were used in place of 1.50 weight part of the ultraviolet absorbing agent (I-14).

COMPARISON EXAMPLE 3

The procedure of Example 1 was repeated except that the ultraviolet absorbing agent (I-14) was not formed.

Evaluation of Optical Filters

Each of the optical filters was attached to the front plate of a commercially available plasma display panel (PDS4202J-H, Fujitsu Limited) by an adhesive in such a manner that the filter layer faces the front plate.

The contract of the displayed image was measured. Further, white light and red light were evaluated.

The optical filter was irradiated with light (from the side opposite to the filter layer) by using a xenon lump (from which a UV filter had been removed) at 100,000 lx for 100 hours. The remaining ratio of the dye was measured at 594 nm and at 530 nm (absorption maximums of the dyes). The remaining ratio (light resistance) was defined by the following formula.

Remaining ratio=100×(100−transmittance after light irradiation)/(100−transmittance before light irradiation)

The results are set forth in Table 2.

TABLE 2

| Ex. | Ultraviolet absorbing agent (amount) | Dye A | Dye N | Contrast | Color W | Color R | Resist. 594 | Resist. 530 |
|---|---|---|---|---|---|---|---|---|
| 9 | I-14 (1.50) | (5) | (B) | 15:1 | A | A | 91% | 96% |
| 10 | I-15 (1.50) | (5) | (B) | 15:1 | A | A | 91% | 95% |
| 11 | I-16 (1.20) + I-13 (0.30) | (5) | (B) | 15:1 | A | A | 90% | 95% |
| 12 | II-9 (1.50) | (5) | (B) | 15:1 | A | A | 90% | 95% |
| 13 | II-3 (0.75) + II-18 (0.75) | (5) | (B) | 15:1 | A | A | 91% | 96% |
| 14 | III-22 (1.50) | (5) | (B) | 15:1 | A | A | 90% | 95% |
| 15 | III-5 (1.50) | (5) | (B) | 15:1 | A | A | 93% | 97% |
| 16 | III-35 (1.00) + III-41 (0.50) | (5) | (B) | 15:1 | A | A | 90% | 95% |
| C3 | None | (5) | (B) | 15:1 | A | A | 62% | 79% |

(Remark)
Ex. C3: Comparison Example 3
Dye A: A methine dye in an aggregated form
Dye N: A dye in a non-aggregated form
Color W: White color of displayed light
Color R: Red color of displayed light
Color (A): Reproduced
Color (B): Not reproduced
Resist.: Light resistance measured at 594 nm and at 530 nm

EXAMPLE 17

A transparent support was prepared in the same manner as in Example 9 was repeated except that the ultraviolet absorbing agent (I-9) was used in place of the ultraviolet absorbing agent (I-14).

An undercoating layer, a hard coating layer and a low refractive index layer were formed on the transparent support in the same manner as in Example 9.

Formation of Infrared Ray Absorbing Layer 5 g of an infrared ray absorbing agent, 17 ml of the high boiling point absorbing agent (1) used in Example 1 and 10 ml of ethyl acetate were mixed, and heated at 50° C. to dissolve the infrared ray absorbing agent in the solvent. The solution was added to 50 g of 20 wt. % aqueous gelatin solution containing 6 ml of 10 wt. % aqueous solution of sodium dodecylbenzenesulfonate. The mixture was stirred at 5,000 rpm for 20 minutes. Water was added to the mixture to obtain 170 g of an emulsion.

The emulsion was coated on the undercoating layer to form an infrared ray absorbing layer.

Formation of Filter Layer

To 180 g of 10 wt. % aqueous gelatin solution, 0.05 g of the methine dye (5) were added. The mixture was filtered through a polypropylene filter (porosity size: 2 μm) to prepare a coating solution for a filter layer.

The coating solution for the filter layer was coated on the undercoating layer, and dried at 120° C. for 10 minutes to form a filter layer (dry thickness: 3.5 μm). Thus, an optical filter was prepared.

The absorption spectrum of the obtained optical filter was measured. The results are shown in FIG. 4.

Figure 4:
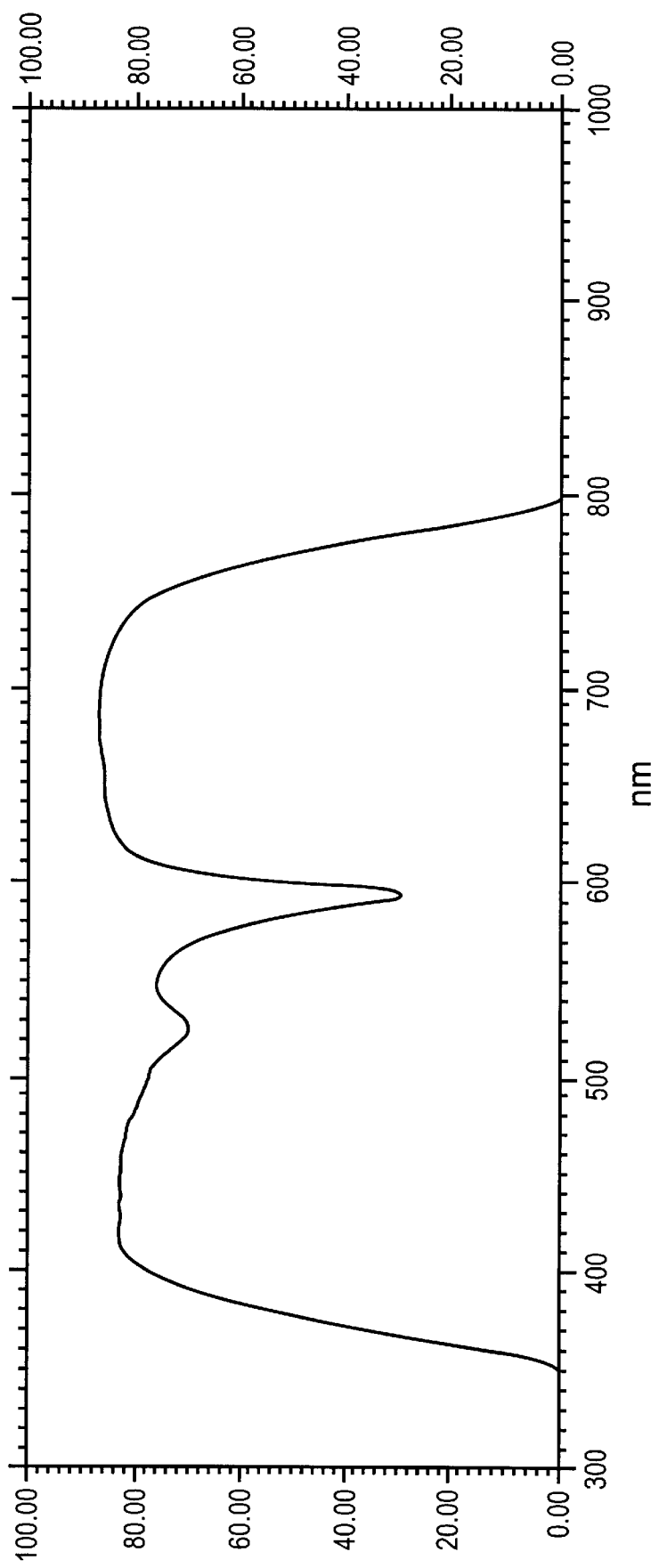
FIG. 4 shows a spectrum of an optical filter prepared in Example 17.

As is shown in FIG. 4, he filter layer has two absorption maximums at 527 nm and 593 nm. The transmittance at 527 nm was 70%, and the transmittance at 593 nm was 30%. The half-width of the absorption maximum at 527 nm was 90 nm, and the half-width of the absorption maximum at 593 nm was 30 nm. Further, light within the ultraviolet region (350 nm or less) and the infrared region (700 nm or more) was completely cut by the filter. Further, the filter transmits light within the visible region (410 to 700 nm) except for the region of 500 to 550 nm and 560 to 620 nm. All of the documents referenced herein are hereby incorporated by reference in each of their entireties herein.

I claim:

1. An optical filter which comprises a transparent support and a filter layer containing a dye and a binder polymer, wherein the dye is a methine dye in an aggregated form, and wherein the transparent support, the filter layer or an optional layer further contains a ultraviolet absorbing agent represented by the formula (I), (II), (III), (IV), (V), (VI), (VII) or (VIII):

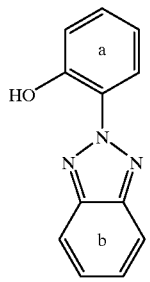
(I)

in which the benzene rings a and b may have a substituent group;

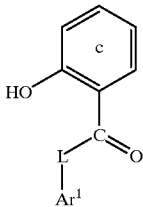
(II)

in which $Ar^1$ is an aryl group or an aromatic heterocyclic group; —L— is a single bond or —O—; and the benzene ring c may have a substituent group;

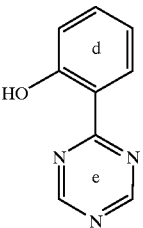
(III)

in which the benzene ring d and the triazine ring e may have a substituent group; and the benzene ring d may be condensed with another aromatic ring or a heterocyclic ring;

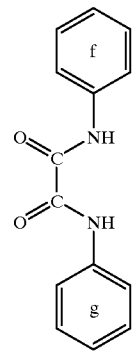
(IV)

in which the benzene rings f and g may have a substituent group;

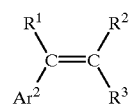
(V)

in which $Ar^2$ is an aryl group or an aromatic heterocyclic group; $R^1$ is hydrogen or an alkyl group; and each of $R^2$ and $R^3$ independently is cyano, —$COR^{13}$, —$COOR^{14}$, —$CONR^{15}R^{16}$, —$SO_2R^{17}$ or —$SO_2NR^{18}R^{19}$, wherein each of $R^{13}$, $R^{14}$, $R^{15}$, $R^{16}$, $R^{17}$, $R^{18}$ and $R^{19}$ independently is hydrogen, an alkyl group, a substituted alkyl group or an aryl group, or $R^2$ and $R^3$ are combined to form a five-membered or six-membered ring;

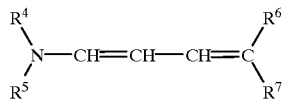
(VI)

in which each of $R^4$ and $R^5$ independently is hydrogen, an alkyl group or an aryl group, or $R^4$ and $R^5$ are combined to form a five-membered or six-membered ring; and each of $R^6$ and $R^7$ independently is cyano, —$COR^{20}$, —$COOR^{21}$, —$CONR^{22}R^{23}$, —$SO_2R^{24}$ or —$SO_2NR^{25}R^{26}$, wherein each of $R^{20}$, $R^{21}$, $R^{22}$, $R^{23}$, $R^{24}$, $R^{25}$ and $R^{26}$ independently is hydrogen, an alkyl group, a substituted alkyl group or an aryl group, or $R^6$ and $R^7$ are combined to form a five-membered or six-membered ring;

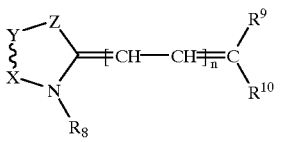
(VIII)

in which $R^8$ is an alkyl group, a substituted alkyl group or an aryl group; each of $R^9$ and $R^{10}$ independently is cyano, —$COR^{27}$, —$COOR^{28}$, —$CONR^{29}R^{30}$, —$SO_2R^{31}$ or —$SO_2NR^{32}R^{33}$, wherein each of $R^{27}$, $R^{28}$, $R^{29}$, $R^{30}$, $R^{31}$, $R^{32}$ and $R^{33}$ independently is hydrogen, an alkyl group, a substituted alkyl group or an aryl group, or $R^9$ and $R^{10}$ are combined to form a five-membered or six-membered ring;

—X~Y— is —CR$^{34}$R$^{35}$—CR$^{36}$R$^{37}$— or —CR$^{38}$=CR$^{39}$—, wherein each of R$^{34}$, R$^{35}$, R$^{36}$, R$^{37}$, R$^{38}$ and R$^{39}$ independently is hydrogen, an alkyl group or an aryl group, or R$^{38}$ and R$^{39}$ are combined to form a benzene or naphthalene ring; —Z— is —O—, —S—, —NR$^{40}$—, —CR$^{41}$R$^{42}$— or —CH=Ch—, wherein R$^{40}$ is an alkyl group, a substituted alkyl group or an aryl group, and each of R$^{41}$ and R$^{42}$ independently is hydrogen or an alkyl group; and n is 0 or 1;

(VIII)

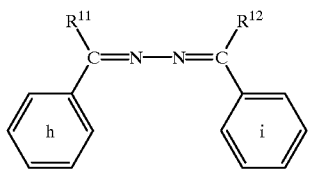

in which each of R$^{11}$ and R$^{12}$ independently is hydrogen, an alkyl group or an aryl group, or R$^{11}$ and R$^{12}$ are combined to form a five-membered or six-membered ring; the benzene rings h and i may have a substituent group; and the benzene rings h and i may be condensed with another aromatic ring or a heterocyclic ring.

2. The optical filter as defined in claim 1, wherein the ultraviolet absorbing agent is an o-substituted phenol represented by the formula (I), (II) or (III).

3. The optical filter as defined in claim 1, wherein the longest wavelength at which the ultraviolet absorbing agent has an absorption maximum is within the wavelength region of 300 to 390 nm.

4. The optical filter as defined in claim 1, wherein the ultraviolet absorbing agent has an absorption, at a wavelength of 50 nm longer than the longest wavelength at which the absorbing agent has an absorption maximum, of less than 10% of the absorption at the absorption maximum.

5. The optical filter as defined in claim 1, wherein the aggregated dye has the absorption maximum within the wavelength region of 560 to 620 nm.

6. The optical filter as defined in claim 1, wherein the filter layer further contains a dye in a non-aggregated from.

7. The optical filter as defined in claim 6, wherein the non-aggregated dye has the absorption maximum within the wavelength region of 500 to 550 nm.

8. The optical filter as defined in claim 1, wherein the optical filter further comprises a low refractive index layer having a refractive index lower than a refractive index of the support.

9. The optical filter as defined in claim 8, wherein the optical filter comprises the filter layer, the transparent support and the low refractive index layer in this order.

10. The optical filter as defined in claim 8, wherein the optical filter comprises the transparent support, the filter layer and the low refractive index layer in this order.

11. A plasma display panel having a display surface covered with an optical filter which comprises a transparent and a filter layer containing a dye and a binder polymer, wherein the dye is a methine dye in an aggregated form, and wherein the transparent support, the filter layer or an optional layer further contains a ultraviolet absorbing agent represented by the formula (I), (II), (III), (IV), (V), (VI), (VII) or (VIII):

(I)

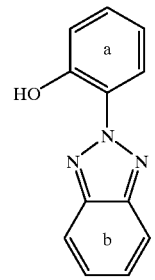

in which the benzene rings a and b may have a substituent group;

(II)

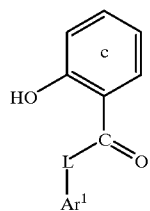

in which Ar$^1$ is an aryl group or an aromatic heterocyclic group; —L— is a single bond or —O—; and the benzene ring c may have a substituent group;

(III)

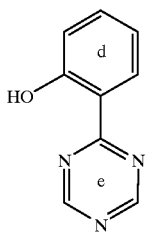

in which the benzene ring d and the triazine ring e may have a substituent group; and the benzene ring d may be condensed with another aromatic ring or a heterocyclic ring;

(IV)

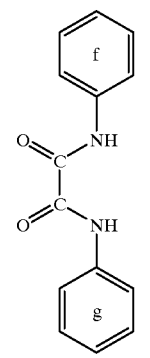

in which the benzene rings f and g may have a substituent group;

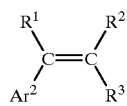

(V)

in which $Ar^2$ is an aryl group or an aromatic heterocyclic group; $R^1$ is hydrogen or an alkyl group; and each of $R^2$ and $R^3$ independently is cyano, $-COR^{13}$, $-COOR^{14}$, $-CONR^{15}R^{16}$, $-SO_2R^{17}$ or $-SO_2NR^{18}R^{19}$, wherein each of $R^{13}$, $R^{14}$, $R^{15}$, $R^{16}$, $R^{17}$, $R^{18}$ and $R^{19}$ independently is hydrogen, an alkyl group, a substituted alkyl group or an aryl group, or $R^2$ and $R^3$ are combined to form a five-membered or six-membered ring;

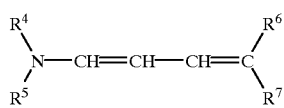

(VI)

in which each of $R^4$ and $R^5$ independently is hydrogen, an alkyl group or an aryl group, or $R^4$ and $R^5$ are combined to form a five-membered or six-membered ring; and each of $R^6$ and $R^7$ independently is cyano, $-COR^{20}$, $-COOR^{21}$, $-CONR^{22}R^{23}$, $-SO_2R^{24}$ or $-SO_2NR^{25}R^{26}$, wherein each of $R^{20}$, $R^{21}$, $R^{22}$, $R^{23}$, $R^{24}$, $R^{25}$ and $R^{26}$ independently is hydrogen, an alkyl group, a substituted alkyl group or an aryl group, or $R^6$ and $R^7$ are combined to form a five-membered or six-membered ring;

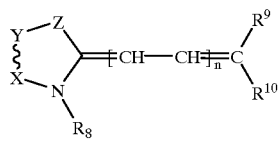

(VII)

in which $R^8$ is an alkyl group, a substituted alkyl group or an aryl group; each of $R^9$ and $R^{10}$ independently is cyano, $-COR^{27}$, $-COOR^{28}$, $-CONR^{29}R^{30}$, $-SO_2R^{31}$ or $-SO_2NR^{32}R^{33}$, wherein each of $R^{27}$, $R^{28}$, $R^{29}$, $R^{30}$, $R^{31}$, $R^{32}$ and $R^{33}$ independently is hydrogen, an alkyl group, a substituted alkyl group or an aryl group, or $R^9$ and $R^{10}$ are combined to form a five-membered or six-membered ring; $-X\sim Y-$ is $-CR^{34}R^{35}-CR^{36}R^{37}-$ or $-CR^{38}=CR^{39}-$, wherein each of $R^{34}$, $R^{35}$, $R^{36}$, $R^{37}$, $R^{38}$ and $R^{39}$ independently is hydrogen, an alkyl group or an aryl group, or $R^{38}$ and $R^{39}$ are combined to form a benzene or naphthalene ring; $-Z-$ is $-O-$, $-S-$, $-NR^{40}-$, $-CR^{41}R^{42}-$ or $-CH=Ch-$, wherein $R^{40}$ is an alkyl group, a substituted alkyl group or an aryl group, and each of $R^{41}$ and $R^{42}$ independently is hydrogen or an alkyl group; and n is 0 or 1;

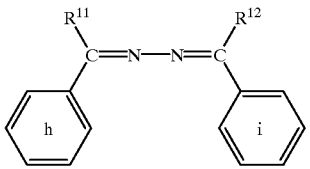

(VIII)

in which each of $R^{11}$ and $R^{12}$ independently is hydrogen, an alkyl group or an aryl group, or $R^{11}$ and $R^{12}$ are combined to form a five-membered or six-membered ring; the benzene rings h and i may have a substituent group; and the benzene rings h and i may be condensed with another aromatic ring or a heterocyclic ring.

12. The plasma display panel as defined in claim 11, wherein the ultraviolet absorbing agent is an o-substituted phenol represented by the formula (I), (II) or (III).

* * * * *